(12) United States Patent
Huang et al.

(10) Patent No.: US 11,913,769 B2
(45) Date of Patent: Feb. 27, 2024

(54) TAB INSPECTION METHOD AND APPARATUS

(71) Applicant: CONTEMPORARY AMPEREX TECHNOLOGY CO., LIMITED, Ningde (CN)

(72) Inventors: Guoda Huang, Ningde (CN); Xiaoyuan Li, Ningde (CN); Chao Xie, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 18/202,786

(22) Filed: May 26, 2023

(65) Prior Publication Data

US 2023/0296370 A1 Sep. 21, 2023

Related U.S. Application Data

(63) Continuation of application No. PCT/CN2022/076806, filed on Feb. 18, 2022.

(51) Int. Cl.
*H01M 10/42* (2006.01)
*H01M 10/48* (2006.01)
*G01B 11/00* (2006.01)

(52) U.S. Cl.
CPC .......... *G01B 11/002* (2013.01); *H01M 10/48* (2013.01); *H01M 10/4285* (2013.01)

(58) Field of Classification Search
CPC .. G01B 11/002; H01M 10/48; H01M 10/4285
See application file for complete search history.

(56) References Cited

FOREIGN PATENT DOCUMENTS

| CN | 203848806 | * | 9/2014 |
|---|---|---|---|
| CN | 203848806 U | | 9/2014 |
| CN | 206832218 U | | 1/2018 |
| CN | 109524704 A | | 3/2019 |
| CN | 109709102 A | | 5/2019 |

(Continued)

OTHER PUBLICATIONS

Contemporary Amperex Technology Co., Limited, International Search Report and Written Opinion, PCT/CN2022/076806, dated Oct. 28, 2022, 17 pgs.

(Continued)

*Primary Examiner* — Lisa S Park
(74) *Attorney, Agent, or Firm* — XSENSUS LLP

(57) ABSTRACT

The present application provides a tab inspection method. The method includes: determining a first start position of the tab in a second direction of the electrode plate according to a first trigger manner, where the second direction is perpendicular to the first direction; determining a second start position of the tab in the second direction of the electrode plate according to a second trigger manner; and determining, according to a distance between the second start position and the first start position, whether a position of the tab on the electrode plate deviates; where the first trigger manner is a manner for determining the start position of the tab based on a change of a height of the electrode plate in the first direction, and the second trigger manner is a manner for determining the start position of the tab based on a preset position of the tab on the electrode plate.

19 Claims, 11 Drawing Sheets

(56) References Cited

FOREIGN PATENT DOCUMENTS

| CN | 112310568 | A | | 2/2021 |
|---|---|---|---|---|
| CN | 112635848 | A | | 4/2021 |
| CN | 212931393 | U | | 4/2021 |
| CN | 214750875 | U | | 11/2021 |
| CN | 113744244 | | * | 12/2021 |
| CN | 113744244 | A | | 12/2021 |
| CN | 114122633 | A | | 3/2022 |
| KR | 20210057965 | | * | 2/2021 |

OTHER PUBLICATIONS

Extended European Patent Application No. dated Dec. 13, 2023 in European Patent Application No. 22879635.5.

* cited by examiner

100

| A first initial position of the tab in a second direction of the electrode plate is determined according to a first trigger manner | ～110 |

| A second initial position of the tab in the second direction of the electrode plate is determined according to a second trigger manner | ～120 |

| It is determined, according to a distance between the second initial position and the first initial position, whether a position of the tab on the electrode plate deviates | ～130 |

```
┌─────────────────────────────────────────────────────────┐
│ Determine M1 pieces of inspection data of the tab       │ ─ 140
│ according to multiple pieces of inspection data of the  │
│ electrode plate at multiple positions of the second     │
│ direction                                               │
└─────────────────────────────────────────────────────────┘
                             │
┌─────────────────────────────────────────────────────────┐
│ Determine, according to the M1 pieces of inspection     │ ─ 150
│ data, whether the shape of the tab is normal            │
└─────────────────────────────────────────────────────────┘
```

*FIG. 9*

TAB INSPECTION METHOD AND APPARATUS

CROSS-REFERENCE TO RELATED APPLICATION

This application is a continuation of PCT Patent Application No. PCT/CN2022/076806, entitled "TAB INSPECTION METHOD AND APPARATUS" filed on Feb. 18, 2022, which is incorporated herein by reference in its entirety.

TECHNICAL FIELD

The present application relates to the field of battery technologies, and in particular, to a tab inspection method and apparatus.

BACKGROUND ART

Battery energy conservation and emission reduction are the key to the sustainable development of the automobile industry. Electric vehicles have become crucial for the sustainable development of the automobile industry due to advantages in energy conservation and environmental protection. Battery technologies are an important factor for the development of electric vehicles.

Typically, a battery includes multiple battery cells, and each battery cell includes an electrode component. The electrode component includes a positive electrode plate and a negative electrode plate, and metal ions move between the positive electrode plate and the negative electrode plate to generate electricity. A tab is disposed in a protruded manner on an end face of the electrode plate that is along a width direction of the electrode plate. Because quality of the tab affects quality and safety of the battery, it is necessary to inspect the tab.

SUMMARY OF THE INVENTION

The present application provides a tab inspection method and apparatus, which can effectively inspect a position deviation of a tab.

According to a first aspect, a tab inspection method is provided, including: determining a first start position of the tab in a second direction of the electrode plate according to a first trigger manner, where the second direction is perpendicular to the first direction; determining a second start position of the tab in the second direction of the electrode plate according to a second trigger manner; and determining, according to a distance between the second start position and the first start position, whether a position of the tab on the electrode plate deviates; where the first trigger manner is a manner for determining the position of the tab based on a change of a height of the electrode plate in the first direction, and the second trigger manner is a manner for determining the position of the tab based on a preset position of the tab on the electrode plate.

The method provides two trigger manners for determining the position of the tab. The first trigger manner is a manner for determining the position of the tab based on the change of the height of the electrode plate in the first direction. The position of the tab determined according to the first trigger manner can be considered as an actual position of the tab, and the position of the tab determined according to the second trigger manner can be considered as a theoretical position of the tab. According to the difference between the positions of the tab determined according to the two trigger manners, it can be determined whether the position of the tab on the electrode plate deviates.

In an implementation manner, the determining a first start position of the tab in a second direction of the electrode plate according to a first trigger manner includes: obtaining multiple pieces of inspection data of the electrode plate at multiple positions of the second direction, where the inspection data is inspection data corresponding to the height of the electrode plate in the first direction; and determining, as the first start position of the tab, a position corresponding to inspection data that increases by a change exceeding a first threshold among the multiple pieces of inspection data.

In the first trigger manner, when the value of the inspection data changes suddenly, it indicates that the inspection position transitions from the non-tab region of the end face of the electrode plate to the tab or transitions from the tab to the non-tab region. Therefore, when the inspection data that increases by a change exceeding the threshold appears among the multiple pieces of inspection data of multiple consecutive positions on the electrode plate, an inspection position corresponding to the inspection data can be considered as the start position of the tab.

For example, the first threshold is between 3 mm and 5 mm.

In an implementation manner, the method further includes: determining M1 pieces of inspection data of the tab according to the multiple pieces of inspection data, where the M1 pieces of inspection data are inspection data of the tab at M1 consecutive positions of the second direction, the M1 pieces of inspection data are inspection data of a height of the tab in the first direction, and M1 is a positive integer greater than 1; and determining, according to the M1 pieces of inspection data, whether a shape of the tab is normal.

In this embodiment, by inspecting the change of the height of the tab at consecutive positions, abnormalities such as damage of the tab or folding of the tab can be inspected in time. Specifically, at M1 consecutive positions of the tab in the second direction, the heights of the tab in the first direction are inspected, and M1 pieces of inspection data corresponding to the M1 positions are obtained. Since the M1 pieces of inspection data are the inspection data of the height of the tab and can reflect the change of the profile of the tab, it can be determined, according to the M1 pieces of inspection data, whether the shape of the tab is normal.

In an implementation manner, the determining M1 pieces of inspection data of the tab according to the multiple pieces of inspection data includes: determining, as initial inspection data, inspection data that increases by a change exceeding the first threshold among the multiple pieces of inspection data; and determining, as the M1 pieces of inspection data of the tab, M1 pieces of consecutive inspection data starting from the initial inspection data.

When the inspection data that increases by a change exceeding the threshold appears among the multiple pieces of inspection data of multiple consecutive positions on the electrode plate, the inspection data is considered as the initial inspection data of the M1 pieces of inspection data of the tab, and the M1 pieces of consecutive inspection data from the initial inspection data are determined as the M1 pieces of inspection data of the tab, so that the M1 pieces of inspection data of the tab can be accurately determined.

In an implementation manner, the determining, according to the M1 pieces of inspection data, whether a shape of the tab is normal includes: selecting N1 pieces of inspection data from the M1 pieces of inspection data, where N1<M1;

and determining, according to a relationship between the N1 pieces of inspection data and a second threshold, whether the tab is folded, where the second threshold is determined based on a preset height of the tab in the first direction.

After the tab is folded, the height of the tab in the first direction decreases and is smaller than the theoretical height of the tab. Therefore, when the values of the N1 pieces of inspection data are smaller than the second threshold, it can be determined that the tab is folded.

In an implementation manner, the determining, according to the M1 pieces of inspection data, whether a shape of the tab is normal includes: respectively selecting N2 pieces of inspection data and N3 pieces of inspection data from the M1 pieces of inspection data, where N2 and N3 are positive integers greater than 1, N2<M1, and N3<M1; and determining, according to a relationship between the N2 pieces of inspection data and a third threshold and a relationship between the N3 pieces of inspection data and a fourth threshold, whether the tab is damaged, where the third threshold and the fourth threshold are determined based on the preset height of the tab in the first direction.

The third threshold and the fourth threshold are determined based on the theoretical height of the tab in the first direction. Therefore, the relationship between the actual height and the theoretical height of the tab can be determined according to the relationship between the N2 pieces of inspection data selected from the M1 pieces of inspection data and the third threshold and the relationship between the N3 pieces of inspection data selected from the M1 pieces of inspection data and the fourth threshold, so as to determine whether the tab is damaged. The method is simple to operate and is highly accurate and can be used to inspect a tab with gradually changing heights on the end face of the electrode plate.

In an implementation manner, the N2 pieces of inspection data are N2 pieces of inspection data in the middle of the M1 pieces of inspection data, and the N3 pieces of inspection data are N3 pieces of inspection data at two ends of the M1 pieces of inspection data.

In an implementation manner, the method further includes: determining P pieces of inspection data of a non-tab region on the end face of the electrode plate according to the multiple pieces of inspection data, where the P pieces of inspection data are inspection data of the non-tab region at P different consecutive positions of the second direction, the P pieces of inspection data are inspection data corresponding to a height of the non-tab region in the first direction, and P is a positive integer greater than 1; and determining, according to the P pieces of inspection data, whether a shape of the end face of the electrode plate is normal.

Similarly, by inspecting the change of the height of the non-tab region of the end face of the electrode plate at consecutive positions, this method can inspect abnormalities such as damage of the end face of the electrode plate or deviation of a material line in time. Specifically, at the P consecutive positions of the non-tab region in the second direction, the heights of the non-tab region in the first direction are inspected, so that the P pieces of inspection data corresponding to the P positions are obtained. Since the P pieces of inspection data are inspection data corresponding to the height of the non-tab region and can reflect the change of the profile of the non-tab region on the end face, it can be determined, according to the P pieces of inspection data, whether the shape, the position, and the like of the end face of the electrode plate are normal. The method is simple to operate and is highly accurate.

In an implementation manner, the determining, according to the P pieces of inspection data, whether a shape of the end face of the electrode plate is normal includes: if differences between more than Q1 pieces of consecutive inspection data among the P pieces of inspection data and inspection data adjacent to the more than Q1 pieces of consecutive inspection data fall within a fifth threshold range, determining that the end face of the electrode plate is damaged, where Q1 is a preset value.

In an implementation manner, the determining, according to the P pieces of inspection data, whether a shape of the end face of the electrode plate is normal includes: if absolute values of the Q2 pieces of inspection data among the P pieces of inspection data are greater than a sixth threshold, determining that a movement direction of the electrode plate deviates from the second direction in an inspection process.

In an implementation manner, the determining a second start position of the tab in the second direction of the electrode plate according to a second trigger manner includes: determining the second start position according to a preset distance between the electrode plate and a preset position.

For example, an encoder or the like can be used to record a running length of the electrode plate relative to the preset position, so that the position of the tab on the electrode plate can be determined according to a fixed distance between adjacent tabs.

In an implementation manner, the method further includes: determining the position of the tab on the electrode plate according to the second trigger manner; and determining, as the M2 pieces of inspection data of the tab, M2 pieces of inspection data corresponding to the position among the multiple pieces of inspection data, where the M2 pieces of inspection data include inspection data corresponding to the first start position, or the M1 pieces of inspection data include inspection data corresponding to the second start position.

In an implementation manner, the determining, according to a distance between the second start position and the first start position, whether a position of the tab on the electrode plate deviates includes: if the distance between the second start position and the first start position is equal to 0, determining that the tab does not deviate; and/or if the distance between the second start position and the first start position is greater than 0, determining that the tab deviates.

The position of the tab determined according to the first trigger manner can be considered as the actual position of the tab, and the position of the tab determined according to the second trigger manner can be considered as the theoretical position of the tab. Therefore, the distance between the first start position and the second start position represents the difference between the actual position and the theoretical position of the tab. When the distance between the first start position and the second start position is equal to 0, it indicates that the actual position of the tab is the same as the theoretical position, and in this case, the tab does not deviate. When the distance between the first start position and the second start position is greater than 0, it indicates that there is a difference between the actual position and the theoretical position of the tab, and in this case, the tab deviates.

In an implementation manner, if it is determined that the tab deviates, the method further includes: if the distance between the second start position and the first start position is less than a seventh threshold, determining that the position of the tab on the electrode plate needs to be adjusted; and/or if the distance between the second start position and the first start position is greater than a seventh threshold, determining that a section of the tab on the electrode plate needs to be removed.

In an implementation manner, multiple tabs disposed in the second direction on the end face of the electrode plate have different heights.

The tab inspection method of the present application can be applied to position inspection of any type of tab, for example, can be applied to a scenario in which heights of multiple tabs on the end face of the electrode plate change continuously, so as to separately inspect whether positions of the tabs with different heights deviate.

In an implementation manner, the method is performed by a tab inspection apparatus, the apparatus is connected to a sensor, the sensor includes an emitting end and a receiving end, the emitting end and the receiving end are disposed opposite to each other on two sides of the electrode plate, so that the electrode plate moves in the second direction between the emitting end and the receiving end, the emitting end is configured to emit light, and the receiving end is configured to collect optical signals when the electrode plate moves to multiple different positions, to obtain multiple pieces of inspection data of the electrode plate at the different positions.

The tab inspection apparatus can be a subsystem independent of a main control system. The apparatus is connected to the sensor to obtain the inspection data of the electrode plate collected by the sensor. Through the cooperation between the apparatus and the sensor, the entire tab inspection system has a simple hardware structure without adding additional costs and is also easy to implement in software. The emitting end and the receiving end of the sensor are disposed opposite to each other on two sides of the electrode plate, and the electrode plate moves between the emitting end and the receiving end in the second direction. When the electrode plate moves to multiple different positions, statuses of blocking, by the tab, light emitted by the emitting end are different and numbers of optical signals received by the receiving end are also different. On this basis, the position of the end face of the electrode plate and the position of the tab protruding from the end face can be determined.

The setting of the position of the sensor is relatively flexible. In an implementation manner, the sensor is configured to inspect the tab in a process of die-cutting the electrode plate to form the tab; or in another implementation manner, the sensor is configured to inspect the tab in a process of winding the electrode plate to form an electrode component.

According to a second aspect, a tab inspection apparatus is provided, configured to implement the method in the first aspect or any implementation manner of the first aspect.

According to a third aspect, a tab inspection apparatus is provided, including a processor and a memory, where the memory is configured to store a computer program, and the processor is configured to invoke the computer program to implement the method in the first aspect or any implementation manner of the first aspect.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

FIG. 2 is a schematic flowchart of a method for inspecting a position of a tab according to an embodiment of the present application;

FIG. 9 is a schematic flowchart of a tab inspection method according to an embodiment of the present application;

Figure 1:
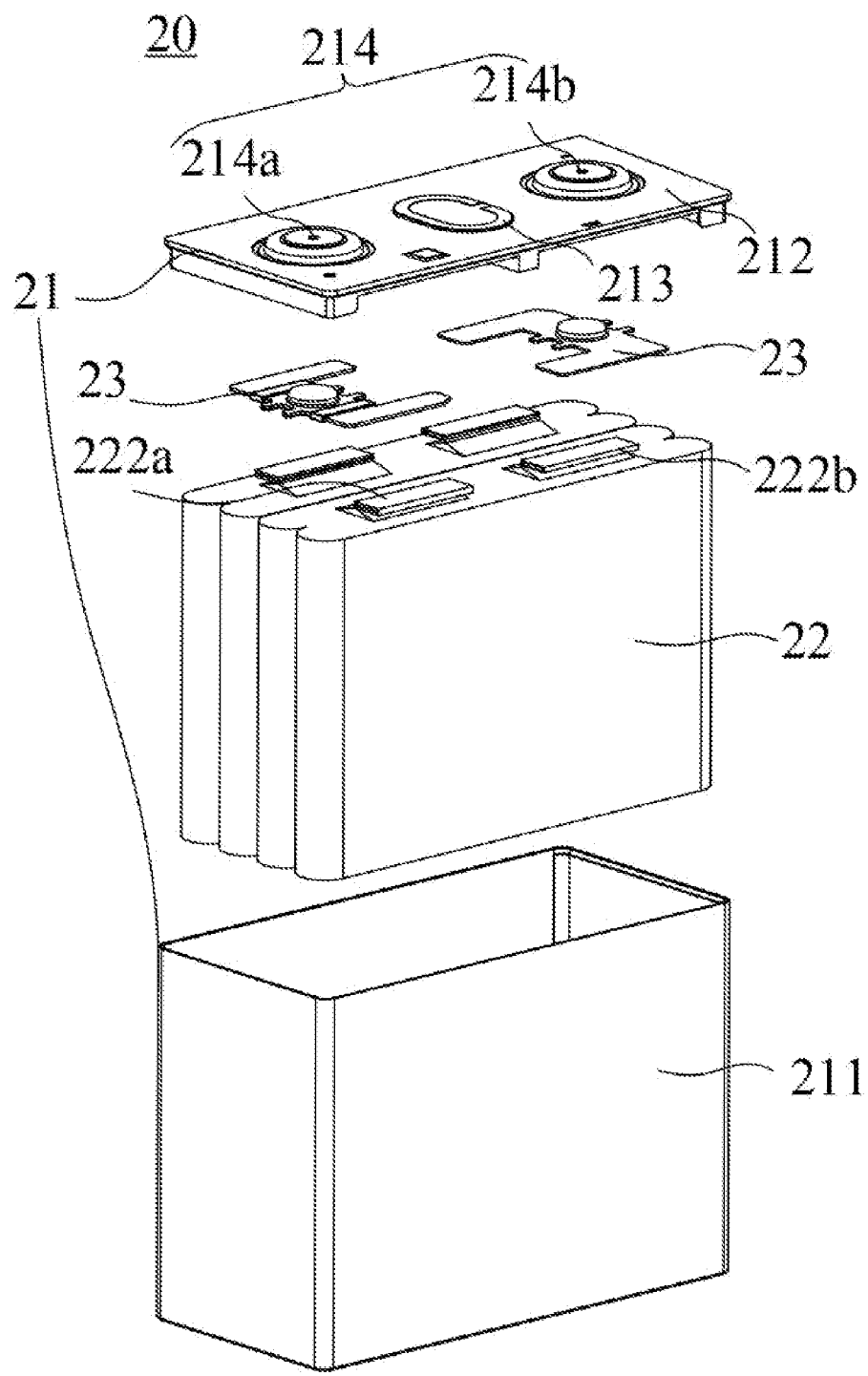
FIG. 1 is a schematic structural view of a battery cell.

In the accompanying drawings, the figures are not drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "multiple" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "disposing", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in an "or" relation.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

The phrase "embodiments" referred to in the present application means that the descriptions of specific features, structures, and characteristics in combination with the embodiments are included in at least one embodiment of the present application. The phrase at various positions in the description does not necessarily refer to the same embodiment, or an independent or alternative embodiment exclusive of another embodiment. Those skilled in the art should understand, in explicit and implicit manners, that an embodiment described in the present application may be combined with another embodiment.

While the present application has been described with reference to the preferred embodiments, various modifications can be made, and equivalents can be provided to substitute for the components thereof without departing from the scope of the present application. In particular, as long as there is no structural conflict, the various technical features mentioned in the embodiments can be combined in any manner. The present application is not limited to the specific embodiments disclosed herein but includes all the technical solutions that fall within the scope of the claims.

The battery mentioned in the present application refers to a single physical module including one or more battery cells to provide a higher voltage and capacity. For example, the battery mentioned in the present application may include a battery module, a battery pack, etc. The battery generally includes a case for enclosing one or more battery cells. The case can prevent liquid or other foreign matters from affecting charging or discharging of a battery monomer.

In some embodiments, the battery cell may include lithium-ion secondary batteries, lithium-ion primary batteries, lithium-sulfur batteries, sodium-lithium-ion batteries, sodium-ion batteries, magnesium-ion batteries, and the like. This is not limited in the embodiments of the present application. Generally, the battery cell can also be called a cell. The battery cell can be in a shape of a cylinder, a flat body, or a cuboid, or other regular or irregular shapes. The technical solutions of the embodiments of the present application can be applied to battery cells of any shape.

The battery cell includes an electrode component and an electrolytic solution. The electrode component includes a positive electrode plate, a negative electrode plate, and a separator. The operation of the battery cell mainly relies on the movement of metal ions between the positive electrode plate and the negative electrode plate. The positive electrode plate includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium ion battery as an example, the positive electrode current collector may be made of aluminum, and the positive electrode active material may be lithium cobalt oxide, lithium iron phosphate, ternary lithium, lithium manganate, etc. The negative electrode plate includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The negative electrode current collector may be made of copper, and the negative electrode active material may be carbon, silicon, etc. In order to ensure that no fusing occurs when a large current passes, there are multiple positive tabs stacked together, and there are multiple negative tabs stacked together. The separator may be made of, for example, polypropylene (Polypropylene, PP) or polyethylene (Polyethylene, PE). In addition, the electrode component may be of a wound structure or a laminated structure. This is not limited in the embodiments of the present application.

Because quality of the tab affects quality and safety of the battery, it is necessary to inspect whether the position of the tab deviates, to ensure the quality of the electrode component.

In view of this, the present application provides a technical solution. The first start position and the second start position of the tab are respectively determined in the first trigger manner and the second trigger manner, and it is determined, based on the distance between the first start position and the second start position, whether the position of the tab deviates, so that corresponding measures are taken to eliminate unqualified tabs or perform other remedial measures if necessary, to improve the quality of the electrode component.

As an example, as shown in FIG. 1, FIG. 1 is a schematic structural diagram of a battery cell 20 according to an embodiment of the present application. The battery cell 20 includes one or more electrode components 22, a casing 211, and an end cap 212. The casing 211 and the end cap 212 form a shell or a battery box 21. Walls of the casing 211 and the end cap 212 are both referred to as walls of the battery cell 20. For a cuboid battery cell 20, the walls of the casing 211 include a bottom wall and four side walls. The casing 211 depends on a combined shape of one or more electrode components 22. For example, the casing 211 can be a hollow cuboid, cube, or cylinder, and one of the surfaces of the casing 211 has an opening so that the one or more electrode components 22 may be placed within the casing 211. For example, when the casing 211 is a hollow cuboid or cube, one of flat faces of the casing 211 is an open face, that is, this flat face has no wall such that the inside of the casing 211 is in communication with the outside. When the casing 211 may be a hollow cylinder, an end face of the casing 211 is an open face, that is, this end face has no wall such that the inside of the casing 211 is in communication with the outside. The end cap 212 covers the opening and is connected to the casing 211 to form a closed cavity for placing the electrode component 22. The casing 211 is filled with electrolyte, such as electrolytic solution.

The battery cell 20 may further include two electrode terminals 214 that may be disposed on the end cap 212. The end cap 212 is generally in the form of a flat plate, the two electrode terminals 214 are fixed to a flat plate face of the end cap 212, and the two electrode terminals 214 are respectively a positive electrode terminal 214a and a negative electrode terminal 214b. Each electrode terminal 214 is correspondingly provided with a collecting member 23 that is also referred to as a current collection member 23. The collecting member 23 is located between the end cap 212 and the electrode component 22 and is configured to perform electrical connection between the electrode component 22 and the electrode terminal 214.

For example, as shown in FIG. 1, each electrode component 22 has a tab 222, such as a first tab 222a and a second tab 222b. The polarities of the first tab 222a and the second tab 222b are opposite. For example, when the first tab 222a is a positive tab, the second tab 222b is a negative tab. The first tabs 222a of one or more electrode components 22 are connected to one electrode terminal through one collecting member 23, and the second tabs 222b of one or more electrode components 22 are connected to another electrode terminal through another collecting member 23. For example, the positive electrode terminal 214a is connected to the positive tab through a connecting member 23, and the negative electrode terminal 214b is connected to the negative tab through another connecting member 23.

One or more electrode components 22 can be disposed in the battery cell 20 according to actual usage requirements. For example, as shown in FIG. 1, four independent electrode components 22 are disposed in the battery cell 20.

A pressure relief mechanism 213 may also be disposed on the battery cell 20. The pressure relief mechanism 213 is configured to be actuated to relieve the internal pressure or temperature when the internal pressure or temperature of the battery cell 20 reaches a threshold.

The pressure relief mechanism 213 can be various possible pressure relief mechanisms, for example, the pressure relief mechanism 213 can be a temperature-sensitive pressure relief mechanism, and the temperature-sensitive pressure relief mechanism is configured to melt when the internal temperature of the battery cell 20 provided with the pressure relief mechanism 213 reaches a threshold; and/or the pressure relief mechanism 213 may be a pressure-sensitive pressure relief mechanism that is configured to fracture when the internal pressure of the battery cell 20 provided with the pressure relief mechanism 213 reaches a threshold.

The multiple battery cells 20 included in the battery 10 can be disposed in any direction in a case 11. The cuboid battery cell 20 shown in FIG. 1 is used as an example. As shown in FIG. 1, multiple battery cells 20 can be disposed in the case 11 in the vertical direction shown in FIG. 1, so that end caps 212 of the disposed multiple battery cells 20 face an upper case 111, while bottom walls of casings 211 of the battery cells 20 face a lower case 112. For another example, different from FIG. 2, the multiple battery cells 20 shown in FIG. 1 can also be disposed laterally in the case 11.

FIG. 2 shows a tab inspection method according to an embodiment of the present application. As shown in FIG. 2, the tab inspection method 100 includes some or all of the following steps.

In step 110, a first start position of the tab 222 in a second direction Y of the electrode plate 221 is determined according to a first trigger manner.

The second direction Y is perpendicular to a first direction X.

In step 120, a second start position of the tab 222 in the second direction Y of the electrode plate 221 is determined according to a second trigger manner.

In step 130, it is determined, according to a distance between the second start position and the first start position, whether a position of the tab 222 on the electrode plate 221 deviates.

The tab 222 in this embodiment of the present application may be, for example, the first tab 222a and the second tab 222b shown in FIG. 1. For example, the first tab 222a is a positive tab and the second tab 222b is a negative tab, or the first tab 222a is a negative tab and the second tab 222b is a positive tab.

The first trigger manner is a manner for determining the position of the tab 222 based on a change of a height of the electrode plate 221 in the first direction X, and the second trigger manner is a manner for determining the position of the tab 222 based on a preset position of the tab on the electrode plate. Herein, the preset position of the tab 222 on the electrode plate 221 refers to a theoretical position or an ideal position of the tab 222 on the electrode plate 221.

In this embodiment, two trigger manners for determining the position of the tab are provided, that is, the first trigger manner and the second trigger manner. The first trigger manner is a manner for determining the position of the tab 222 based on the change of the height of the electrode plate 221 in the first direction X. The position of the tab 222 determined according to the first trigger manner can be considered as an actual position of the tab 222, and the position of the tab 222 determined according to the second trigger manner can be considered as a theoretical position of the tab 222. According to the difference between the positions of the tab 222 determined according to the two trigger manners, it can be determined whether the position of the tab 222 on the electrode plate 221 deviates, that is, whether the actual position of the tab 222 deviates or dislocates from the theoretical position of the tab.

Figure 3:
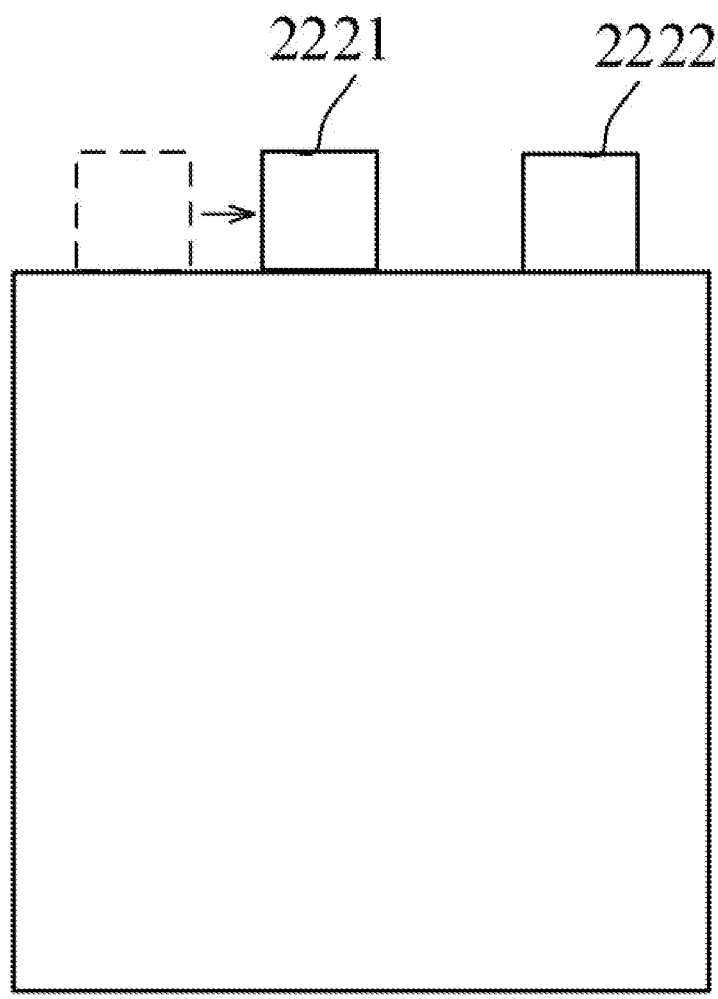
FIG. 3 is a schematic diagram in which an electrode position deviates.

The tab 222 may be an anode tab 2221 or a cathode tab 2222. As an example, FIG. 3 shows the anode tab 2221 and the cathode tab 2222 on the electrode component 22. There is a distance between a theoretical position (dashed box) and an actual position (solid box) of the anode tab 2221. As an example in FIG. 3, the position of the anode tab 2221 deviates towards the cathode tab 2222. The position deviation of the tab directly affects the quality of the electrode component. Moreover, when the deviation is serious, serious safety problems are caused because a distance between the anode tab 2221 and the cathode tab 2222 is excessively small.

In an implementation manner, in step 110, the determining a first start position of the tab 222 in a second direction Y of the electrode plate 221 according to a first trigger manner includes: obtaining multiple pieces of inspection data of the electrode plate 221 at multiple positions of the second direction Y; and determining, as the first start position of the tab 222, a position corresponding to inspection data that increases by a change exceeding a first threshold among the multiple pieces of inspection data.

In this embodiment of the present application, the inspection data is inspection data corresponding to the height of the electrode plate 221 in the first direction X, that is, height data of the electrode plate 221.

Figure 4:
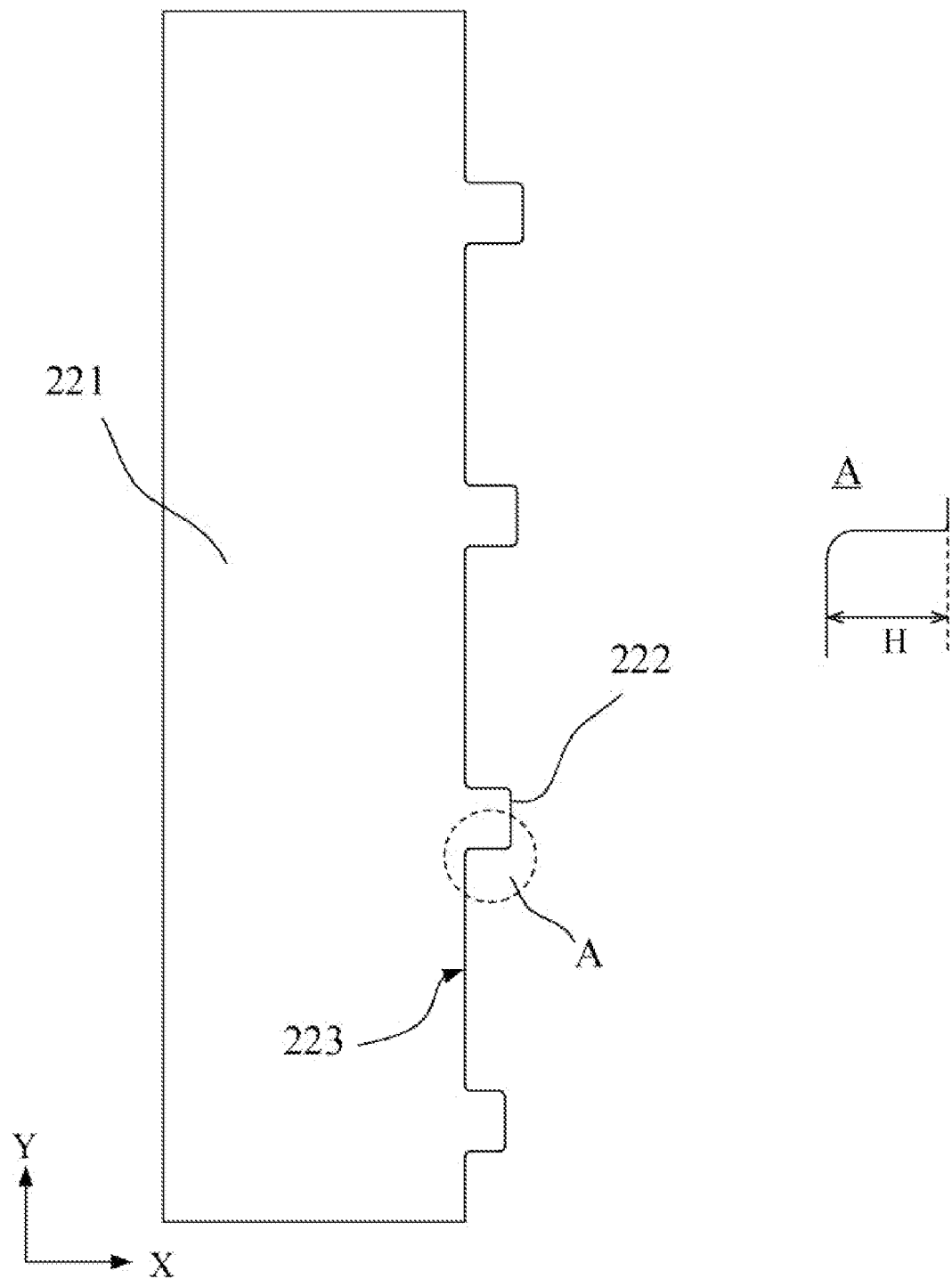
FIG. 4 is a schematic diagram of an electrode plate according to an embodiment of the present application.

As shown in FIG. 4, the first direction X is a width direction of the electrode plate, that is, a direction of the width of the electrode plate, and the tab 222 protrudes from the end face 223 of the electrode plate 221 in the first direction X. Since the height of the electrode plate 221 is continuously inspected, the inspection position may be the tab 222 or the non-tab region of the end face 223. In a region A shown in FIG. 4, in the first trigger manner, when the value of the inspection data changes suddenly, that is, the height changes suddenly, it indicates that the inspection position transitions from the non-tab region of the end face 223 of the electrode plate 221 to the tab 222 or transitions from the tab 222 to the non-tab region. Therefore, when the inspection data that increases by a change exceeding the first threshold appears among the inspection data of heights of multiple consecutive positions on the electrode plate 221, an inspection position corresponding to the inspection data can be considered as the start position of the tab 222 on the electrode plate 221.

The first threshold is a preset value, for example, the first threshold may be between 3 mm and 5 mm.

Similarly, a position corresponding to inspection data that decreases by a change exceeding a first threshold among the multiple pieces of inspection data may be determined as a start position of the non-tab region on the end face 223.

In an implementation manner, in step 120, the determining a second start position of the tab 222 in a second direction Y of the electrode plate 221 according to a second trigger manner includes: determining the second start position according to a preset distance between the electrode plate 221 and a preset position.

The second trigger manner depends on the preset position of the tab 222 on the electrode plate 221, that is, the theoretical position of the tab 222 on the electrode plate 221. Since the tabs 222 are disposed at fixed intervals on the end face 223 of the electrode plate 221, the second start position of the tab 222 can be determined according to the theoretical position of the tab 222 on the electrode plate 221 without introducing other auxiliary calculation. For example, the position of each tab 222 on the end face 223 of an ideal electrode plate 221 can be stored in advance, and the theoretical position of the tab 222 in a process of winding the electrode plate 221 to form the electrode component 22 can also be stored in advance. An encoder records the running length of the electrode plate 221, so that the second start position of the tab 222 can be determined.

The preset position may be, for example, an initial inspection position of the electrode plate 221, an inspection position located behind the initial inspection position and having a preset distance from the initial inspection position, a feeding position, or other preset positions. In the tab inspection process, the electrode plate 221 runs at a specific speed. The sensor 300 is disposed at a fixed position, and is configured to inspect a height of a part that is of the electrode plate 221 and that reaches the position during running. During running of the electrode plate 221, an encoder can be used to record the running length of the electrode plate 221.

For example, assuming that a distance between two adjacent tabs 222 is a fixed value $\Delta L$, if it is determined that the position of the first tab 222 does not deviate, the second start position of the second tab 222 to be inspected should be away from the second start position of the first tab 222 by $\Delta L$. In this case, when the encoder records that the electrode plate 221 runs by $\Delta L$ from the second start position of the first tab 222, the second start position of the second tab 222 can be determined, so as to determine, according to the method 100, whether the position of the second tab 222 deviates.

For another example, assuming that the distance between the tab 222 to be inspected and the preset position is a fixed value L1, when the encoder records that the electrode plate 221 runs by L1 relative to the preset position, the second start position of the second tab 222 can be determined, so as to determine, according to the method 100, whether the position of the second tab 222 deviates.

In an implementation manner, the determining, according to a distance between the second start position and the first start position, whether a position of the tab 222 on the electrode plate 221 deviates includes: if the distance between the second start position and the first start position is equal to 0, determining that the tab 222 does not deviate; and/or if the distance between the second start position and the first start position is greater than 0, determining that the tab 222 deviates.

The position of the tab 222 determined according to the first trigger manner can be considered as the actual position of the tab 222, and the position of the tab 222 determined according to the second trigger manner can be considered as the theoretical position of the tab 222. Therefore, the distance between the first start position and the second start position represents the difference between the actual position and the theoretical position of the tab 222. When the distance between the first start position and the second start position is equal to 0, it indicates that the actual position of the tab 222 is the same as the theoretical position, and in this case, the tab 222 does not deviate. When the distance between the first start position and the second start position is greater than 0, it indicates that there is a difference between the actual position and the theoretical position of the tab 222, and in this case, the tab 222 deviates.

Further, in an implementation manner, if it is determined that the tab 222 deviates, the method 100 further includes: if the distance between the second start position and the first start position is less than a seventh threshold, determining that the position of the tab 222 on the electrode plate 221 needs to be adjusted; and/or if the distance between the second start position and the first start position is greater than a seventh threshold, determining that a section of the tab 222 on the electrode plate 221 needs to be removed.

The seventh threshold is a preset value, for example, the seventh threshold is between 5 mm and 10 mm.

When it is determined that the tab 222 deviates, different operations may be performed according to a degree of the deviation. For example, if the distance between the second start position and the first start position is less than the seventh threshold, that is, when the deviation between the actual position and the theoretical position of the tab 222 is small, an operator may be reminded to perform relevant operations to adjust the position of the tab 222 on the electrode plate 221. For example, if the degree of deviation of the position of the tab 222 is less than the seventh threshold, the position of the tab 222 can be adjusted before the tab is wound to form the electrode component 22, for example, the thickness of the electrode plate 221 is changed or a winding circumference of the electrode plate 221 is adjusted through pressing.

If the distance between the second start position and the first start position is greater than the seventh threshold, that is, when the deviation between the actual position and the theoretical position of the tab 222 is relatively large, remedy is very difficult. In this case, a section of the tab 222 on the electrode plate 221 needs to be removed, to avoid affecting the quality of the electrode component 22, avoid scrapping of the entire electrode component 22 due to dislocation of the tab after the electrode component 22 is formed, and reduce waste of materials and costs. For example, if the degree of deviation of the position of the tab 222 is greater than the seventh threshold, only the section that is of the electrode plate 221 and that corresponds to the deviated tab 222 may be wound, so as to remove the deviated tab 222 from the electrode plate. This is not limited in the present application.

When the tab 222 is damaged or folded and other abnormalities occur, because the change between heights of the tab 222 and the non-tab region is not obvious, the first start position of the tab 222 may not be inspected based on the first trigger manner. In this case, in determining whether the position of the tab 222 deviates, the first start position and the second start position used may not be the start position of the same tab 222, thus causing an inspection error.

For example, the second start position is the theoretical start position of the tab 222 to be inspected. The first start position of the tab 222 is not inspected due to some reasons, and instead, the first start position of a next tab 222 is directly inspected. In this case, in determining whether the position of the tab 222 deviates, since the first start position used is the actual start position of the next tab 222, if it is determined, still according to the first start position and the second start position, whether the position of the tab 222 deviates, a wrong result is caused.

Therefore, after the start positions of the tab 222 are respectively determined based on the first trigger manner and the second trigger manner, the start positions need to be confirmed, to determine whether the first start position and the second start position are respectively the actual start position and the theoretical start position of the tab 222 to be inspected.

In an implementation manner, the method 100 may further include: determining the position of the tab 222 on the electrode plate 221 according to the second trigger manner; and determining, as the M2 pieces of inspection data of the tab, M2 pieces of inspection data corresponding to the position among the multiple pieces of inspection data of the electrode plate 221 at multiple consecutive positions, where the M2 pieces of inspection data include inspection data corresponding to the first start position, or the M1 pieces of inspection data include inspection data corresponding to the second start position.

That is, if the first start position of a specific tab 222 is inspected first and then the second start position of the specific tab is inspected, the inspection data corresponding to the second start position determined based on the second trigger manner needs to be located within the M1 pieces of inspection data determined based on the first trigger manner. If the second start position of the specific tab is inspected first and then the first start position of the specific tab is inspected, the inspection data corresponding to the first start position determined based on the first trigger manner needs to be located within the M2 pieces of inspection data determined based on the second trigger manner.

In this way, it can be ensured that the distance between the first start position and the second start position does not exceed a width of a single tab 222, and it can be determined that the first start position and the second start position are start positions of the same tab 222. Therefore, in determining whether the position of the tab 222 deviates, this avoids that inspection of start positions of different tabs 222 causes an inspection error.

In an implementation manner, the method 100 may be executed by a tab inspection apparatus 200, and the apparatus 200 may be, for example, a programmable logic controller (Programmable Logic Controller, PLC). In some embodiments, the apparatus 200 may be a subsystem relatively independent from a main control system, that is, a main program PLC, and the subsystem may perform signal transmission with the main control system.

For example, the apparatus 200 includes a data obtaining unit 210 and a data processing unit 220. The data obtaining unit 210 is connected with the sensor 300, the sensor 300 is configured to collect inspection data of heights of the electrode plate 221 at different positions, and the data obtaining unit 210 is configured to obtain multiple pieces of inspection data from the sensor 300. The data processing unit 220 is configured to determine, according to the multiple pieces of inspection data, whether the position of the tab 222 deviates.

After determining whether the position of the tab 222 deviates, the apparatus 200 can feed back, to the main control system, an indication signal indicating whether the position deviates, so as to take corresponding measures.

Figure 5:
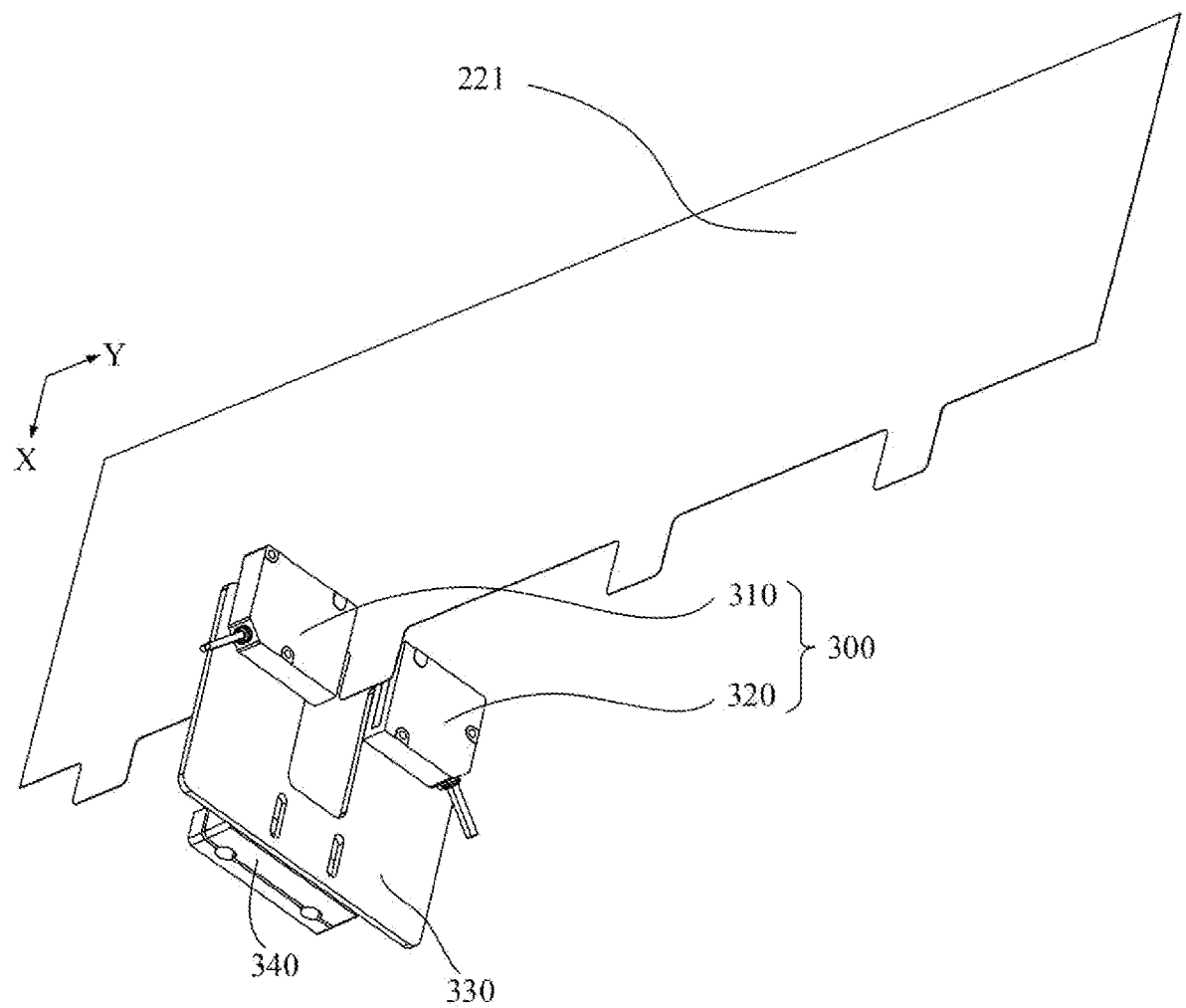
FIG. 5 is a schematic diagram of collecting data of a tab by a sensor according to an embodiment of the present application.

FIG. 5 is a schematic diagram of collecting tab data by a sensor 300. As shown in FIG. 5, the sensor 300 includes an emitting end 310 and a receiving end 320, the emitting end 310 and the receiving end 320 are disposed opposite to each other on two sides of the electrode plate 221, so that the electrode plate 221 moves in the second direction Y between the emitting end 310 and the receiving end 320, the emitting end 310 is configured to emit light, and the receiving end 320 is configured to collect optical signals when the electrode plate 221 moves to multiple different positions, to obtain multiple pieces of inspection data of the electrode plate 221 at the different positions.

The emitting end 310 and the receiving end 320 are fastened through an installation plate 330 and an installation block 340. The emitting end 310 and the receiving end 320 of the sensor 300 are disposed opposite to each other on two sides of the electrode plate 221, and the electrode plate 221 moves between the emitting end 310 and the receiving end 320 in the second direction Y. When the electrode plate 221 moves to multiple different positions, statuses of blocking, by the tab 222, light emitted by the emitting end 310 are different and numbers of optical signals received by the receiving end 320 are also different. On this basis, the height of the tab 222 protruding on the end face 223 of the electrode plate 221 and the height of the non-tab region on the end face 223 can be determined. When the electrode plate 221 is stationary, the number of signals collected by the receiving end 320 when the emitting end 310 irradiates the end face 223 can be used as a zero point of inspection data. In this case, since no tab blocks, the number of signals collected by the receiving end 320 is the largest.

In this case, the sensor 300 collects original data of heights of the electrode plate 221 at different positions, the data obtaining unit 210 can obtain the original data from the sensor 300, and the original data can be an electrical signal output by the receiving end 320 when light irradiates the receiving end 320. The data obtaining unit 310 converts multiple pieces of original data collected by the sensor into multiple pieces of inspection data, that is, multiple pieces of height data, and determines the first start position of the tab 222 according to the multiple pieces of height data.

As can be seen, the tab inspection apparatus 200 is connected to the sensor 300 to obtain the inspection data of the electrode plate 221 collected by the sensor 300. Through the cooperation between the apparatus 200 and the sensor 300, the entire tab inspection system has a simple hardware structure without adding additional costs and is also easy to implement in software.

Multiple tabs 222 protrude from the end face 223 of the electrode plate 221 in the first direction X, and the heights of the multiple tabs 222 may be the same or different. For example, as shown in FIG. 4, the multiple tabs 222 disposed on the end face 223 of the electrode plate 221 in the second direction Y have different heights. FIG. 4 uses four tabs 222 as an example, and heights of the four tabs 222 gradually increase from bottom to top in the second direction Y. For tabs 222 with different heights, when the electrode plate 221 is wound to form the electrode component 22, a tab 222 with a larger height can be located on the outer ring while a tab 222 with a smaller height can be located on the inner ring, thereby improving structural reliability of the tab 222.

The tab inspection method 100 of the embodiments of the present application can inspect whether the positions of multiple tabs 222 with the same height deviate. In particular, the method 100 can also be applied to a scenario in which heights of multiple tabs 222 on the end face 223 of the electrode plate 221 change continuously, to inspect whether positions of multiple tabs 222 with different heights deviate.

In an implementation manner, a height that is of an inspection region formed by light emitted by the emitting end 310 of the sensor 300 and that is in the first direction X at least covers the height of the tab 222.

The inspection region that is formed by the light emitted by the emitting end 310 of the sensor 300 and that is on the electrode plate 221, that is, a light irradiation region, should at least cover the height of the tab 222. For example, the inspection region exceeds the theoretical height H0 of the tab 222 in the first direction X, and in the first direction X, exceeds the end face by 1 mm to 3 mm in the direction away from the tab 222. In this way, when the height of the electrode plate 221 changes, the signal received by the receiving end 320 changes significantly, so that the first start position of the electrode plate 222 can be inspected in time and the inspection sensitivity is higher.

The sensor 300 collects multiple pieces of inspection data of the electrode plate 221 at multiple consecutive positions based on a specific response speed. When the electrode plate 221 moves in the second direction Y at a certain speed v, the sensor 300 collects data once every a specific distance. For example, the response speed of the sensor 300 is 1 ms, the width of the tab 222 in the first direction X is m, and the running speed v of the electrode plate 221 is N mm/s. Therefore, an inspection interval of the sensor 300 in the second direction Y, that is, a distance n between adjacent inspection positions is (N/1000). In addition, a number of pieces of inspection data corresponding to each tab 222 is m/n. For example, a width m of the tab 222 may fall within a range of 20 mm to 60 mm. Hereinafter, the inspection interval n is also referred to as a data collection interval n.

For example, when the electrode plate 221 moves in the second direction Y at a speed v=1500 mm/s to 2000 mm/s, the corresponding data collection interval is 1.5 mm to 2 mm. When the electrode plate 221 moves in the second direction Y at a speed v=2000 mm/s to 4000 mm/s, the corresponding data collection interval is 2 mm to 4 mm.

The setting of the position of the sensor 300 is relatively flexible. In an implementation manner, the sensor 300 is configured to inspect the tab 222 in a process of die-cutting the electrode plate to form the tab. Alternatively, in another implementation manner, the sensor 300 is configured to inspect the tab 222 in a process of winding the electrode plate 221 to form an electrode component.

Figure 6:
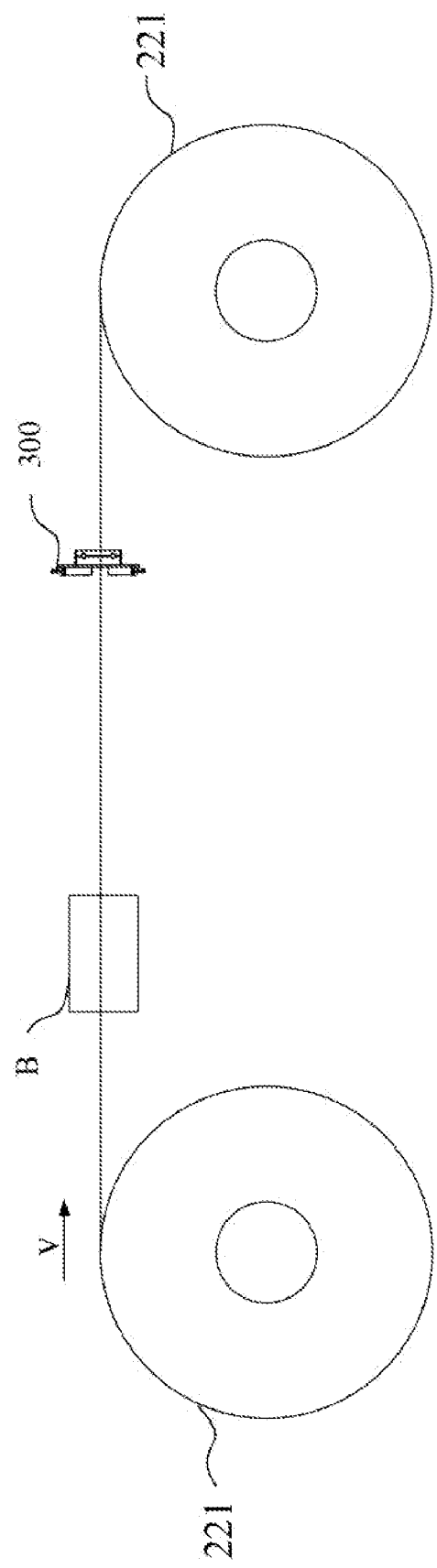
FIG. 6 is a schematic diagram of an installation position of a sensor according to an embodiment of the present application.

For example, as shown in FIG. 6, the sensor 300 is configured to inspect the tab 222 in a tab forming process. The tab 222 can be formed, for example, through laser die-cutting or mechanical die-cutting. A die-cutting position is, for example, a position B shown in FIG. 6. After the tab 222 is formed through die-cutting on the end face 223 of the electrode plate 221, the electrode plate 221 is wound to form an electrode plate material roll required in a subsequent winding process. The sensor 300 can be disposed in a region in which the electrode plate is not wound, to inspect whether the position of the electrode plate 222 deviates, so that a problematic tab 222 can be inspected in an earlier process. When a tab 222 with a deviated position is inspected, the tab 222 can be marked, so that the problematic tab 222 can be specially treated in the subsequent process.

Figure 7:
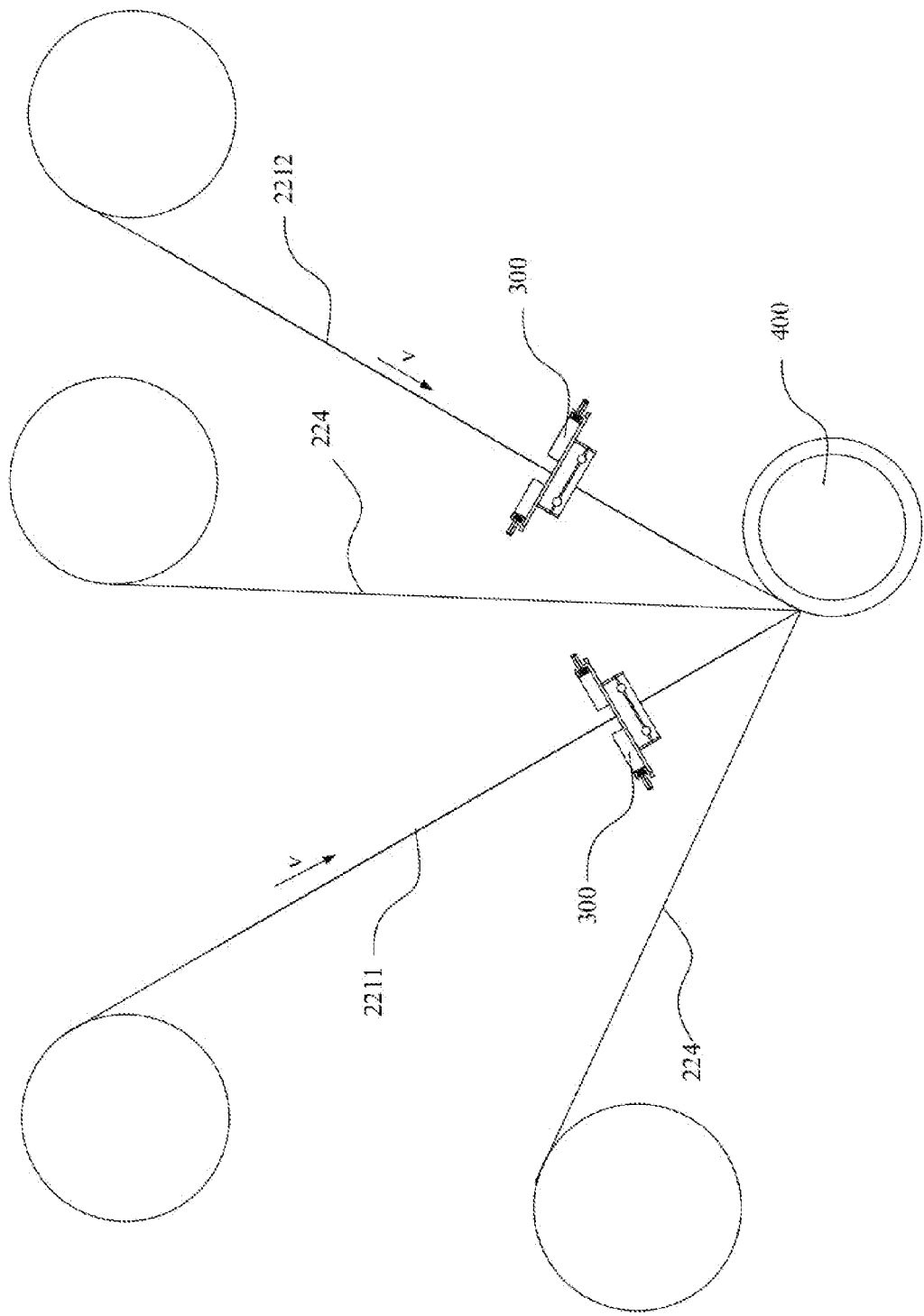
FIG. 7 is a schematic diagram of an installation position of a sensor according to an embodiment of the present application.

For another example, as shown in FIG. 7, the electrode component 22 includes two types of electrode plates 221 and two layers of separators 224. The sensor 300 is disposed in the process of winding the electrode plate 221 to form the electrode component 22. The two types of electrode plates 221 are respectively cathode electrode plates 2211 or anode electrode plates 2212. The cathode electrode plate 2211, the anode electrode plate 2212, and the separator 224 are wound together according to the position shown in FIG. 6, to form the electrode component 22. Through the unwinding and feeding of the electrode plate 221 and the separator 224, a winding needle 400 drives the cathode electrode plate 2211, the anode electrode plate 2212, and the separator 224 to move, so that the cathode electrode plate, the anode electrode plate, and the separator are wound along with the winding needle 400. The sensor 300 may be disposed at a position at which the cathode electrode plate 2211 and the anode electrode plate 2212 are not wound to form the electrode component 22, so as to inspect a deviated tab 222 before the electrode component 22 is formed.

Figure 8:
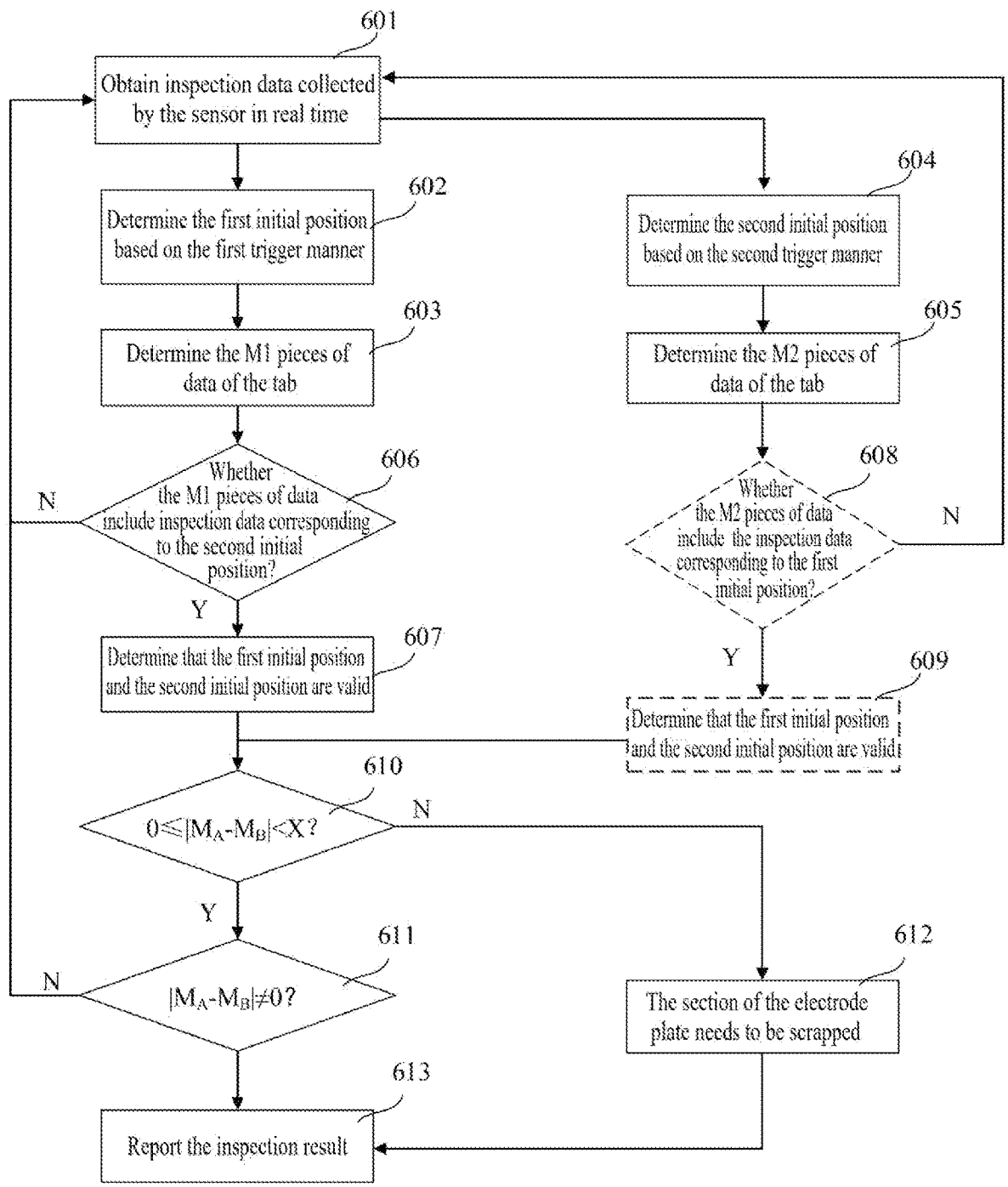
FIG. 8 is a schematic flowchart of a specific implementation manner based on the method shown in FIG. 2.

FIG. 8 is a flowchart of a possible specific implementation manner of the method 100 shown in FIG. 2. In FIG. 8, it may be inspected whether the position of the tab 222 deviates.

As shown in FIG. 8, in step 601, inspection data collected by the sensor 300 in real time is obtained.

For example, as shown in FIG. 5, the electrode plate 221 runs in the second direction Y at a specific speed v, and the sensor 300 collects inspection data of the electrode plate 221 at multiple consecutive positions in the second direction Y according to a specific response frequency.

In step 602, the first start position of the tab 222 is determined based on the first trigger manner.

When the inspection data that increases by a change exceeding the first threshold appears among the multiple pieces of inspection data collected by the sensor 300, an inspection position corresponding to the inspection data is determined as the first start position.

In step 603, the M1 pieces of inspection data of the height of the tab 222 are determined based on the first trigger manner.

Inspection data that increases by a change exceeding the first threshold can be used as initial inspection data, and M1 pieces of inspection data starting from the initial inspection data are determined as the M1 pieces of inspection data of the tab 222.

In step 604, the second start position of the tab 222 is determined based on the second trigger manner.

For example, the second start position is determined based on a running length of the electrode plate 221 recorded by an encoder relative to a preset position.

In step 605, the M2 pieces of inspection data of the height of the tab 222 are determined based on the second trigger manner.

The position of the tab 222 on the electrode plate 221 can be determined based on the second trigger manner, and the M2 pieces of inspection data corresponding to the position of the tab 222 are determined among the multiple pieces of inspection data collected by the sensor 300.

Step 602 and step 604 can be executed in parallel. The first start position may be located before the second start position, and in this case, step 602 is completed first, that is, the first start position is inspected first, and then step 604 is completed to inspect the second start position. Alternatively, the first start position may be located after the second start position, and in this case, step 604 is completed first, that is, the second start position is inspected first, and then step 602 is completed to inspect the first start position.

To determine whether the first start position and the second start position are reliable, it is necessary to confirm the first start position and the second start position through step 606 and/or step 607.

In step 606, it is determined whether the M1 pieces of data include inspection data corresponding to the second start position.

In step 607, it is determined that the first start position and the second start position are valid.

In step 608, it is determined whether the inspection data corresponding to the first start position is included in the M2 pieces of data.

In step 609, it is determined that the first start position and the second start position are valid.

It can be understood that it is assumed that the first start position and the second start position are start positions of the same tab 222. Then, if the first start position is located before the second start position, that is, the actual start position of the tab 222 is located before the theoretical start position, the M1 pieces of inspection data include the inspection data corresponding to the second start position. If the second start position is located before the first start position, that is, the theoretical start position of the tab 222 is located before the actual start position, the M2 pieces of inspection data include the inspection data corresponding to the first start position.

Therefore, if it is determined in step 606 that the M1 pieces of inspection data include the inspection data corresponding to the second start position, step 607 is executed. If it is determined in step 608 that the M2 pieces of inspection data include the inspection data corresponding to the first start position, step 609 is executed.

Only step 606 and step 607 may be performed, or only step 608 and step 609 may be performed.

For example, as shown in FIG. 8, assuming that the first start position of the tab 222 is located before the second start position, only step 606 and step 607 are performed. As long as it is determined that the inspection data corresponding to the second start position is located within the M1 pieces of inspection data, it can be considered that the first start position and the second start position are valid. In this case, the inspection data corresponding to the first start position is not included in the M2 pieces of inspection data.

After the first start position and the second start position are confirmed, step 610 to step 613 are executed.

In step 610, it is determined whether $0 \le |MA-MB| < X$ is satisfied, where X is the seventh threshold, MA and MB are the first start position and the second start position respectively, and $|MA-MB|$ indicates the distance between the first start position and the second start position.

If $0 \le |MA-MB| < X$ is satisfied, step 611 is executed. Otherwise, the position of the tab 222 on the surface has a large deviation and needs to be scrapped.

In step 611, it is determined whether $|MA-MB| \ne 0$ is satisfied.

If $|MA-MB| \ne 0$, it indicates that the position of the tab 222 has a small deviation and can be compensated by appropriate measures. If $|MA-MB|=0$, it indicates that the position of the tab 222 does not deviate.

In step 612, the inspection result is reported to the main control system.

It can be seen that the method 100 can conveniently inspect the position of the tab 222 and ensure the quality of the electrode component 22 without increasing additional hardware costs.

In an implementation manner, as shown in FIG. 9, the method 100 may further include step 140 and step 150.

In step 140, M1 pieces of inspection data of the tab 222 are determined according to multiple pieces of inspection data of the electrode plate 221 at multiple positions of the second direction Y.

As shown in FIG. 4, the tab 222 protrudes from the end face 223 of the electrode plate 221 in the first direction X, the M1 pieces of inspection data are the inspection data of the tab 222 at M1 consecutive positions of the second direction Y, and the M1 pieces of inspection data are the inspection data of the height of the tab 222 in the first direction X.

The second direction Y is perpendicular to the first direction X, and M1 is a positive integer greater than 1.

In step 150, it is determined, according to the M1 pieces of inspection data, whether the shape of the tab 222 is normal.

Herein, that the shape of the tab 222 is normal means that abnormalities affecting the quality of the electrode component 22 do not occur, for example, the tab 222 is damaged or folded.

In this embodiment, by inspecting the change of the height of the tab 222 at consecutive positions, abnormalities such as damage of the tab or folding of the tab can be inspected in time. Specifically, at M1 consecutive positions of the tab 222 in the second direction Y, the heights of the tab 222 in the first direction X are inspected, and M1 pieces of inspection data corresponding to the M1 positions are obtained. Since the inspection data is the inspection data of the height of the tab 222 and can reflect the change of the profile of the tab 222, it can be determined, according to the M1 pieces of inspection data, whether the shape of the tab 222 is normal.

In an implementation manner, in step 140, the determining the M1 pieces of inspection data of the tab 222 according to multiple pieces of inspection data of the electrode plate 221 at multiple positions of the second direction Y includes: determining, as initial inspection data, inspection data that increases by a change exceeding the first threshold among the multiple pieces of inspection data; and determining, as the M1 pieces of inspection data of the tab 222, M1 pieces of consecutive inspection data starting from the initial inspection data.

Certainly, in determining the inspection data of the tab 222 based on the first trigger manner, alternatively, the initial inspection data of the tab 222 may be searched for first, then the initial inspection data of the non-tab region is searched for, and multiple pieces of inspection data between the initial inspection data of the tab 222 and the initial inspection data of the non-tab region are used as the multiple pieces of inspection data of the tab 222. It is assumed that a number of the multiple pieces of inspection data is M1.

In this embodiment of the present application, the M1 pieces of inspection data of the tab can be determined based on the first trigger manner. Alternatively, the M2 pieces of inspection data of the electrode plate 221 may be determined among the multiple pieces of inspection data of the electrode plate 221 at multiple positions of the second direction Y based on the second trigger manner, and it may be determined, according to the M2 pieces of inspection data, whether the shape of the tab 222 is normal.

In this case, the M1 pieces of inspection data obtained based on the first trigger manner in step 140 and step 150 may be replaced by the M2 pieces of inspection data obtained based on the second trigger manner.

Hereinafter, the M1 pieces of inspection data of the tab 222 are used as an example, to specifically describe how to determine, according to the M1 pieces of inspection data of the tab 222, whether the shape of the tab 222 is normal. A specific process of determining, based on the M2 pieces of inspection data of the tab 222, whether the shape of the tab 222 is normal is similar to the process of determining the shape of the tab based on the M1 pieces of inspection data, and is not repeated herein for brevity.

In an implementation manner, in step 150, the determining, according to the M1 pieces of inspection data, whether the shape of the tab 222 is normal includes: selecting N1 pieces of inspection data from M1 pieces of inspection data; and determining, according to a relationship between the N1 pieces of inspection data and a second threshold, whether the tab 222 is folded.

N1 is a positive integer greater than 1, and N1<M1.

The second threshold is determined based on a preset height H0 of the tab 222 in the first direction X, that is, a theoretical height H0 of the tab 222.

Therefore, the relationship between the actual height and the theoretical height H0 of the tab 222 can be determined according to the relationship between the N1 pieces of inspection data selected from the M1 pieces of inspection data and the second threshold, so as to determine whether the tab is folded. The method is simple to operate and is highly accurate and can be used to inspect a tab with gradually changing heights on the end face of the electrode plate.

After the tab 222 is folded, the height of the tab 222 in the first direction X decreases and is smaller than the theoretical height H0 of the tab. Therefore, in an implementation manner, the determining, according to the relationship between the N1 pieces of inspection data and the second threshold, whether the tab 222 is folded includes: if values of the N1 pieces of inspection data are less than the second threshold, determining that the tab 222 is folded.

The second threshold may be, for example, H0−X or H0/2−X, where H0 is the preset height of the tab 222 in the first direction X, that is, the theoretical height of the tab 222.

X is a preset value, for example, X is between 2 mm and 3 mm.

N1 is a preset value, for example, N1=b×M, b is a preset coefficient, and 0<b<1, for example, b=$2/3$. In this case, N1=($2/3$)×M.

In an implementation manner, in step 150, the determining, according to the M1 pieces of inspection data, whether the shape of the tab 222 is normal includes: respectively selecting N2 pieces of inspection data and N3 pieces of inspection data from the M1 pieces of inspection data; and determining, according to a relationship between the N2 pieces of inspection data and a third threshold and a relationship between the N3 pieces of inspection data and a fourth threshold, whether the tab 222 is damaged.

N2 and N3 are positive integers greater than 1, N2<M1, and N3<M1.

The third threshold and the fourth threshold are determined based on the preset height H0 of the tab 222 in the first direction X, that is, the theoretical height H0 of the tab 222.

Therefore, the relationship between the actual height and the theoretical height H0 of the tab 222 can be determined according to the relationship between the N2 pieces of inspection data selected from the M1 pieces of inspection data and the third threshold and the relationship between the N3 pieces of inspection data selected from the M1 pieces of inspection data and the fourth threshold, so as to determine whether the tab 222 is damaged. The method is simple to operate and is highly accurate and can be used to inspect a tab with gradually changing heights on the end face of the electrode plate.

In an implementation manner, the determining, according to the relationship between the N2 pieces of inspection data and the third threshold and the relationship between the N3 pieces of inspection data and the fourth threshold, whether the tab 222 is damaged includes: if values of more than K1 pieces of consecutive inspection data among the N2 pieces of inspection data are less than the third threshold and values of more than K2 pieces of inspection data among the N3 pieces of inspection data are greater than the fourth threshold, determining that the tab 222 is damaged.

The height of the tab 222 in the first direction X changes after the tab 222 is damaged, and the height of the damaged position is smaller than the theoretical height H0 of the tab 222. Therefore, when values of more than K1 pieces of consecutive inspection data among the N2 pieces of inspection data are less than the third threshold and values of more than K2 pieces of inspection data among the N3 pieces of inspection data are greater than the fourth threshold, it may be determined that the tab 222 is damaged.

The third threshold may be, for example, H0/3. The fourth threshold may be, for example, 2H0/3. H0 is the preset height of the tab 222 in the first direction X, that is, the theoretical height of the tab 222.

K1 and K2 are preset values, for example, K1=2 and/or K2=M/2.

In an implementation manner, the N2 pieces of inspection data are N2 pieces of inspection data in the middle of the M1 pieces of inspection data, and the N3 pieces of inspection data are N3 pieces of inspection data at two ends of the M1 pieces of inspection data.

Considering that damage to the middle region of the tab 222 causes more severe harm than damage to the edge region of the tab 222, damage to the middle region of the tab 222 is even more intolerable. The N2 pieces of inspection data in the middle of the M1 pieces of inspection data and the N3 pieces of inspection data at two ends of the M1 pieces of inspection data are selected, and it may be determined, according to differences between the height of the middle region of the tab 222 and the heights of two ends, whether the tab 222 is damaged.

N1 and N2 are preset values, for example, N2=($1/3$)×M, and/or N3=($2/3$)×M. That is, the N2 pieces of inspection data are ($1/3$)×M1 pieces of inspection data in the middle of the M1 pieces of inspection data, and the N3 pieces of inspection data are (⅔)×M1 pieces of inspection data at two ends of the M1 pieces of inspection data.

The inspection of the tab 222 is described above, and a similar method can also be used to inspect whether the shape of the end face 223 of the electrode plate 221 is normal.

In an implementation manner, the method 100 further includes: obtaining P pieces of inspection data of the non-tab region on the end face 223 of the electrode plate 221; and determining, according to the P pieces of inspection data, whether a shape of the end face 223 of the electrode plate 221 is normal.

The P pieces of inspection data are inspection data of the non-tab region at P different positions of the second direction Y, the P pieces of inspection data are inspection data corresponding to heights of the non-tab region in the first direction X, and P is a positive integer greater than 1.

Herein, that the shape of the end face 223 is normal means that abnormalities affecting the quality of the electrode component 22 do not occur, for example, the end face 223 is damaged or deviates in the material line. Therefore, step 140 may also be determining, according to the M1 pieces of inspection data, whether the shape of the end face 223 is abnormal, including cases such as whether there is damage and material line deviation.

Similarly, in this embodiment, by inspecting the change of the height of the non-tab region of the end face 223 of the electrode plate 221 at consecutive positions, this method inspects abnormalities such as damage of the end face 223 of the electrode plate 221 or deviation of a material line in time. Specifically, at the P consecutive positions of the non-tab region in the second direction Y, the heights of the non-tab region in the first direction X are inspected, so that the P pieces of inspection data corresponding to the P positions are obtained. Since the P pieces of inspection data are inspection data corresponding to the height of the non-tab region and can reflect the change of the profile of the non-tab region on the end face 223, it can be determined, according to the P pieces of inspection data, whether the shape, the position, and the like of the end face 223 of the electrode plate 221 are normal. The method is simple to operate and is highly accurate.

In an implementation manner, the determining, according to the P pieces of inspection data, whether a shape of the end face 223 of the electrode plate 221 is normal includes: if differences between more than Q1 pieces of consecutive inspection data among the P pieces of inspection data and inspection data adjacent to the more than Q1 pieces of consecutive inspection data fall within a fifth threshold range, determining that the end face 223 of the electrode plate 221 is damaged.

When the difference between inspection data corresponding to multiple consecutive pairs of adjacent positions among the P pieces of inspection data falls within the fifth threshold range, it can be considered that the end face 223 of the electrode plate 221 is damaged.

Q1 is a preset value, for example, Q1=4.

The fifth threshold range may be a preset value range, for example, the fifth threshold range is 1 mm to 3 mm.

In an implementation manner, in step 140, the determining, according to the P pieces of inspection data, whether a shape of the end face 223 of the electrode plate 221 is normal includes: if absolute values of the Q2 pieces of inspection data among the P pieces of inspection data are greater than a sixth threshold, determining that a movement direction of the electrode plate 221 deviates from the second direction Y in an inspection process.

Ideally, the height corresponding to the non-tab region on the end face 223 is 0. When a specific number of pieces of Q2 inspection data among the P pieces of inspection data are greater than the preset sixth threshold, it means that the height of the non-tab region changes. In this case, it can be considered that the movement direction of the electrode plate 221 deviates relative to the second direction Y in the inspection process, that is, the material line deviates. Material line deviation may also affect the quality of the electrode component 22 formed by winding the electrode plate 221.

Q2 is a preset value, for example, Q2=(⅔)×P.

The sixth threshold is a preset value, for example, the sixth threshold is 0.5 mm.

Figure 10:
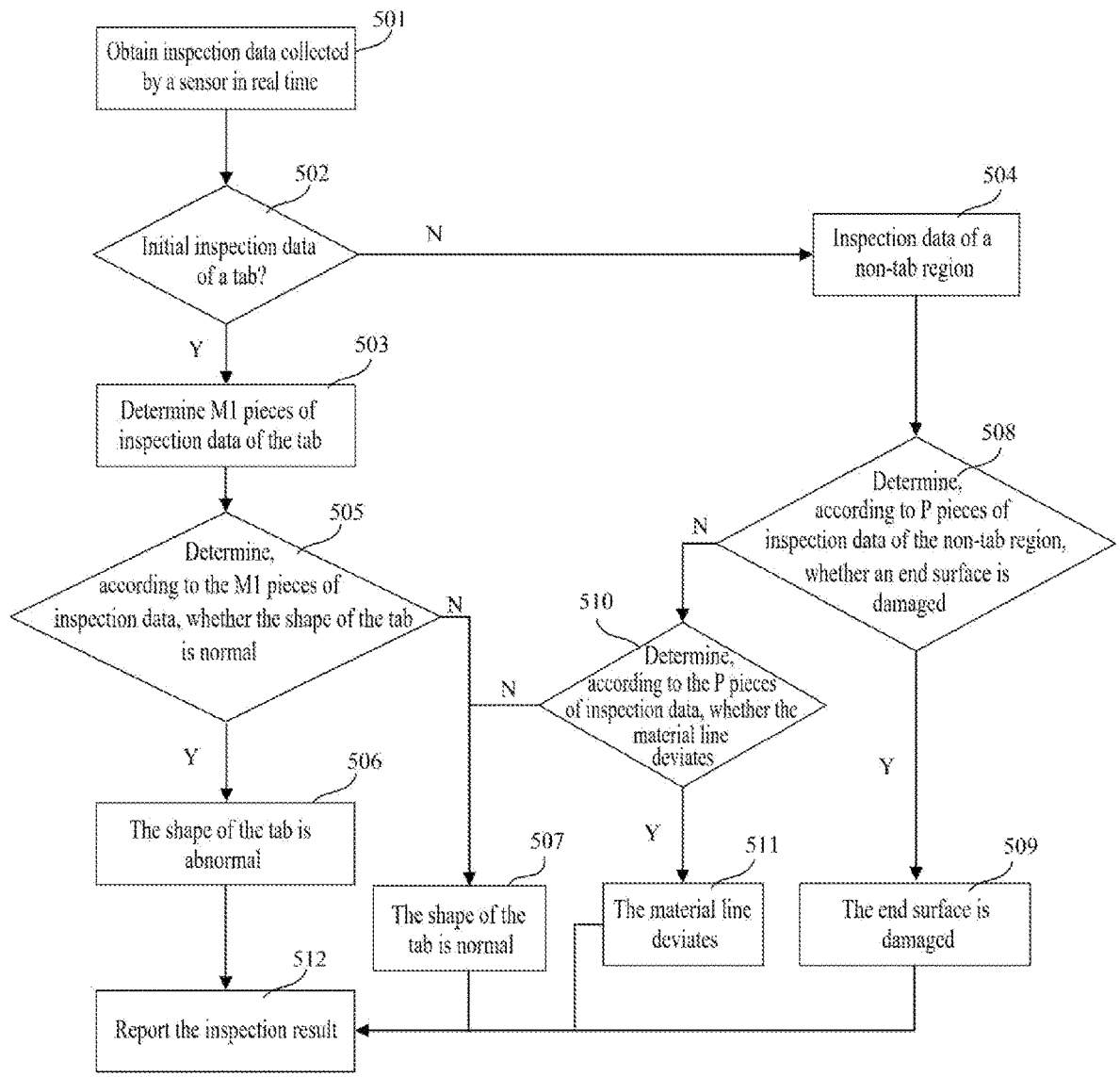
FIG. 10 is a schematic flowchart of a specific implementation manner based on the method shown in FIG. 9.

FIG. 10 is a flowchart of a possible specific implementation manner of the method 100 shown in FIG. 9. In FIG. 10, the shapes of the tab 222 and the end face 223 can be inspected, including whether the tab 222 is damaged, whether the tab 222 is folded, whether the end face 223 is damaged, and whether the movement direction of the electrode plate 221 deviates relative to the second direction Y.

As shown in FIG. 10, in step 501, inspection data collected by the sensor 300 in real time is obtained.

For example, as shown in FIG. 4, the electrode plate 221 runs in the second direction Y at a specific speed v, and the sensor 300 collects inspection data of the electrode plate 221 at multiple consecutive positions in the second direction Y according to a specific response frequency.

FIG. 10 uses the first trigger manner as an example to obtain the data of the height of the tab 222.

In step 502, it is determined whether the initial inspection data of the tab 222 is collected.

If the initial inspection data of the tab 222 is collected, step 503 is executed. Otherwise, step 504 is executed.

In step 503, M1 pieces of consecutive inspection data starting from the initial inspection data of the tab 222 are determined as the M1 pieces of inspection data of the tab 222.

In step 505, it is determined, according to the M1 pieces of inspection data, whether the shape of the tab 222 is normal.

For example, in step 505, it can be determined whether values of more than 2 pieces of inspection data of M1/3 pieces of inspection data in the middle of the M1 pieces of inspection data are less than H0/3, and whether values of M1/2 pieces of inspection data of 2M1/3 pieces of inspection data at the two ends of the M1 pieces of inspection data are greater than 2H0/3.

If values of more than 2 pieces of inspection data of M1/3 pieces of inspection data in the middle of the M1 pieces of inspection data are less than H0/3, and values of M1/2 pieces of inspection data of 2M1/3 pieces of inspection data at the two ends of the M1 pieces of inspection data are greater than 2H0/3, it is considered that the tab 222 is damaged and step 506 is executed. Otherwise, step 507 is executed.

For another example, in step 505, it may be determined whether (⅔)×M1 pieces of inspection data among the M1 pieces of inspection data are smaller than H0-X.

If (⅔)×M1 pieces of inspection data among the M1 pieces of inspection data are smaller than H0-X, it is considered that the tab 222 is folded and step 506 is executed. Otherwise, step 507 is executed.

In step 506, it is determined that the shape of the tab 222 is abnormal.

In step 507, it is determined that the shape of the tab 222 is normal.

If the initial inspection data of the tab 222 is not collected in step 502, step 504 is executed.

In step 504, P pieces of inspection data of the non-tab region are determined.

In step 508, it is determined, according to the P pieces of inspection data, whether the end face 223 is damaged.

For example, in step 508, it may be determined whether a difference between two pieces of adjacent inspection data among the P pieces of inspection data of the non-tab region falls within 1 mm to 3 mm and this type of inspection data appears continuously for more than 4 times.

If a difference between two pieces of adjacent inspection data falls within 1 mm to 3 mm and this type of inspection data appears continuously for more than 4 times, step 509 is executed. Otherwise, step 510 is executed.

In step 509, it is determined that the end face 223 of the electrode plate 221 is damaged.

In step 510, it is determined, according to the P pieces of inspection data, whether the material line deviates.

For example, in step 510, it may be determined whether more than (⅔)×P pieces of inspection data among the P pieces of inspection data of the non-tab region are greater than 0.5 mm.

If more than (⅔)×P pieces of inspection data among the P pieces of inspection data of the non-tab region are greater than 0.5 mm, step 511 is executed.

In step 511, it is determined that the material line deviates, that is, the movement direction of electrode plate 221 deviates relative to the second direction Y in the inspection process.

In step 512, the inspection result is reported to the main control system.

When heights of multiple tabs on the electrode plate 221 are the same, it can usually be determined, based on whether a signal transmitted by the sensor is interrupted, whether the tab 222 is folded. For example, if the signal is interrupted, it means that the tab 222 is not folded and the signal is interrupted by the tab 222, and if the signal is not interrupted or is partially interrupted, it means that the tab 222 is folded. However, this method cannot inspect the tab 222 whose height changes gradually.

The tab inspection method of the present application can be applied to a scenario in which heights of multiple tabs on the end face of the electrode plate change continuously, so as to sequentially inspect the tabs with different heights. The method can determine, based on a corresponding strategy, whether the position of the tab deviates and whether the tab is damaged or folded, and then take appropriate measures. In addition, in the tab inspection process, the method can also inspect whether the end face of the electrode plate is damaged and whether the material line deviates, which ensures the quality of the electrode component in many ways.

Figure 11:
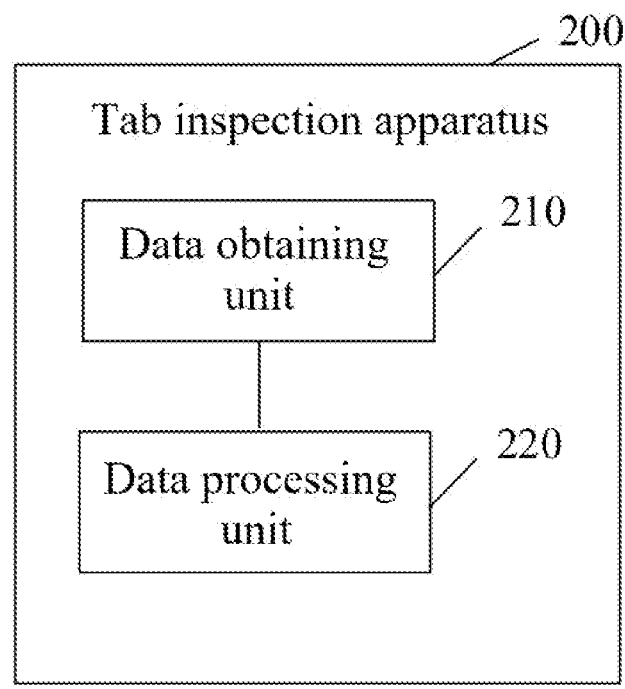
FIG. 11 is a schematic block diagram of a tab inspection apparatus according to an embodiment of the present application.

FIG. 11 shows a tab inspection apparatus 200 according to the present application, and the apparatus 200 is configured to execute the method 100 in any of the above implementation manners. The apparatus 200 includes a data obtaining unit 210 and a data processing unit 220.

The data obtaining unit 210 is configured to: obtain multiple pieces of inspection data of the electrode plate 221 at multiple positions of the second direction Y, where the inspection data is inspection data corresponding to the height of the electrode plate 221 in the first direction X.

The data processing unit 220 is configured to: determine a first start position of the tab 222 in a second direction Y of the electrode plate 221 according to a first trigger manner, where the second direction Y is perpendicular to the first direction X; determine a second start position of the tab 222 in the second direction Y of the electrode plate 221 according to a second trigger manner; and determine, according to a distance between the second start position and the first start position, whether a position of the tab 222 on the electrode plate 221 deviates. The first trigger manner is a manner for determining the position of the tab 222 based on a change of a height of the electrode plate 221 in the first direction X, and the second trigger manner is a manner for determining the position of the tab 222 based on a preset position of the tab on the electrode plate.

In an implementation manner, the data processing unit 220 is specifically configured to: determine, as the first start position of the tab 222, a position corresponding to inspection data that increases by a change exceeding a first threshold among the multiple pieces of inspection data.

For example, the first threshold is between 3 mm and 5 mm.

In an implementation manner, the data processing unit 220 is further configured to: determine M1 pieces of inspection data of the tab 222 according to the multiple pieces of inspection data, where the M1 pieces of inspection data are inspection data of the tab 222 at M1 consecutive positions of the second direction Y, the M1 pieces of inspection data are inspection data of a height of the tab 222 in the first direction X, and M1 is a positive integer greater than 1; and determine, according to the M1 pieces of inspection data, whether a shape of the tab 222 is normal.

In an implementation manner, the data processing unit 220 is specifically configured to: determining, as initial inspection data, inspection data that increases by a change exceeding the first threshold among the multiple pieces of inspection data; and determine, as the M1 pieces of inspection data of the tab 222, M1 pieces of consecutive inspection data starting from the initial inspection data.

In an implementation manner, the data processing unit 220 is specifically configured to: select N1 pieces of inspection data from the M1 pieces of inspection data, where N1<M1; and determine, according to a relationship between the N1 pieces of inspection data and a second threshold, whether the tab 222 is folded, where the second threshold is determined based on a preset height of the tab 222 in the first direction X.

In an implementation manner, the data processing unit 220 is specifically configured to: respectively select N2 pieces of inspection data and N3 pieces of inspection data from the M1 pieces of inspection data, where N2 and N3 are positive integers greater than 1, N2<M1, and N3<M1; and determine, according to a relationship between the N2 pieces of inspection data and a third threshold and a relationship between the N3 pieces of inspection data and a fourth threshold, whether the tab 222 is damaged, where the third threshold and the fourth threshold are determined based on the preset height of the tab 222 in the first direction X.

For example, the N2 pieces of inspection data are N2 pieces of inspection data in the middle of the M1 pieces of inspection data, and the N3 pieces of inspection data are N3 pieces of inspection data at two ends of the M1 pieces of inspection data.

In an implementation manner, the data processing unit 220 is further configured to: determine P pieces of inspection data of a non-tab region on the end face 223 of the electrode plate 221 according to the multiple pieces of inspection data, where the P pieces of inspection data are inspection data of the non-tab region at P different consecutive positions of the second direction Y, the P pieces of inspection data are inspection data corresponding to a height of the non-tab region in the first direction X, and P is a positive integer greater than 1; and determine, according to the P pieces of inspection data, whether a shape of the end face 223 of the electrode plate 221 is normal.

In an implementation manner, the data processing unit 220 is specifically configured to: if differences between more than Q1 pieces of consecutive inspection data among the P pieces of inspection data and inspection data adjacent to the more than Q1 pieces of consecutive inspection data fall within a fifth threshold range, determine that the end face 223 of the electrode plate 221 is damaged, where Q1 is a preset value.

In an implementation manner, the data processing unit 220 is specifically configured to: if absolute values of the Q2 pieces of inspection data among the P pieces of inspection data are greater than a sixth threshold, determine that a movement direction of the electrode plate 221 deviates from the second direction Y in an inspection process.

In an implementation manner, the data processing unit 220 is specifically configured to: determine the second start position according to a preset distance between the electrode plate 221 and a preset position.

In an implementation manner, the data processing unit 220 is further configured to: determine the position of the tab 222 on the electrode plate 221 according to the second trigger manner; and determine, as the M2 pieces of inspection data of the tab 222, M2 pieces of inspection data corresponding to the position among the multiple pieces of inspection data, where the M2 pieces of inspection data include inspection data corresponding to the first start position, or the M1 pieces of inspection data include inspection data corresponding to the second start position.

In an implementation manner, the data processing unit 220 is specifically configured to: if the distance between the second start position and the first start position is equal to 0, determine that the tab 222 does not deviate; and/or if the distance between the second start position and the first start position is greater than 0, determining that the tab 222 deviates.

In an implementation manner, the data processing unit 220 is specifically configured to: if it is determined that the tab 222 deviates and the distance between the second start position and the first start position is less than a seventh threshold, determine that the position of the tab 222 on the electrode plate 221 needs to be adjusted; and/or if the distance between the second start position and the first start position is greater than a seventh threshold, determining that a section of the tab 222 on the electrode plate 221 needs to be removed.

In an implementation manner, multiple tabs 222 disposed in the second direction Y on the end face 223 of the electrode plate 221 have different heights.

In an implementation manner, the apparatus 200 is connected to the sensor 300, the sensor 300 includes an emitting end 310 and a receiving end 320, the emitting end 310 and the receiving end 320 are disposed opposite to each other on two sides of the electrode plate 221, so that the electrode plate 221 moves in the second direction Y between the emitting end 310 and the receiving end 320, the emitting end 310 is configured to emit light, and the receiving end 320 is configured to collect optical signals when the electrode plate 221 moves to multiple different positions, to obtain multiple pieces of inspection data of the electrode plate 221 at the different positions.

In an implementation manner, the sensor 300 is configured to inspect the tab 222 in a process of die-cutting the electrode plate to form the tab. Alternatively, the sensor 300 is configured to inspect the tab 222 in a process of winding the electrode plate to form an electrode component.

For the specific process of inspecting the tab 222 by the apparatus 200, reference may be made to the description of the method 100 in various embodiments of the present application, and details are not repeated herein for brevity.

Figure 12:
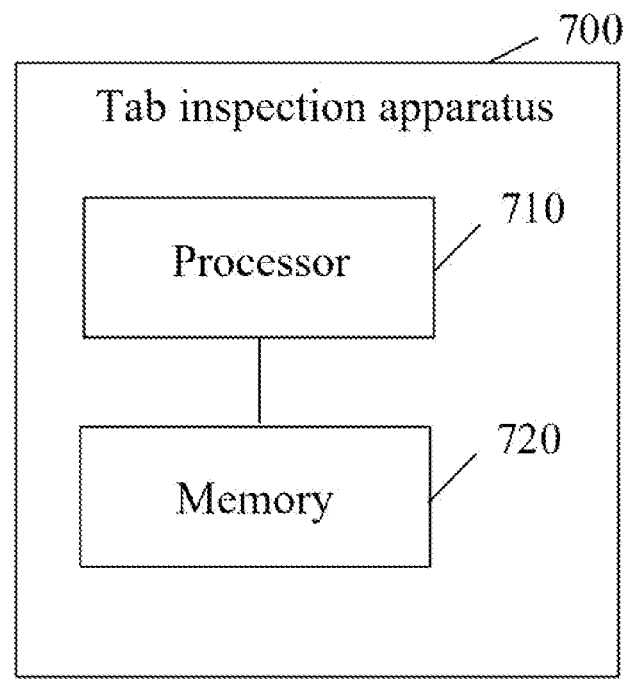
FIG. 12 is a schematic block diagram of a tab inspection apparatus according to an embodiment of the present application.

As shown in FIG. 12, the present application further provides a tab inspection apparatus 700, including a processor 710 and a memory 720, where the memory 720 is configured to store a computer program, and the processor 710 is configured to invoke the computer program to execute the method 100 in any one of the above implementation.

For the specific process of inspecting the tab by the apparatus 700, reference may be made to the description of the method 100 in various embodiments of the present application, and details are not repeated herein for brevity.

Although the present application has been described with reference to the preferred embodiments, various improvements may be made to the present application without departing from the scope of the present application and parts thereof may be replaced with equivalents. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A tab inspection method, wherein a tab protrudes from an end face of an electrode plate along a first direction, and the method comprises:
   determining a first start position of the tab in a second direction of the electrode plate according to a first trigger manner, wherein the second direction is perpendicular to the first direction;
   determining a second start position of the tab in the second direction of the electrode plate according to a second trigger manner; and
   determining, according to a distance between the second start position and the first start position, whether a position of the tab on the electrode plate deviates;
   wherein the first trigger manner is a manner for determining the position of the tab based on a change of a height of the electrode plate in the first direction, and the second trigger manner is a manner for determining the position of the tab based on a preset position of the tab on the electrode plate, and
   wherein the method is performed by a tab inspection apparatus, the apparatus is connected to a sensor, the sensor comprises an emitting end and a receiving end, the emitting end and the receiving end are disposed opposite to each other on two sides of the electrode plate, so that the electrode plate moves in the second direction between the emitting end and the receiving end, the emitting end is configured to emit light, and the receiving end is configured to collect optical signals when the electrode plate moves to multiple different positions, to obtain multiple pieces of inspection data of the electrode plate at the different positions.

2. The method according to claim 1, wherein the determining a first start position of the tab in a second direction of the electrode plate according to a first trigger manner comprises:
   obtaining multiple pieces of inspection data of the electrode plate at multiple positions of the second direction, wherein the inspection data is inspection data corresponding to the height of the electrode plate in the first direction; and determining, as the first start position of the tab, a position corresponding to inspection data that increases by a change exceeding a first threshold among the multiple pieces of inspection data.

3. The method according to claim 2, wherein the first threshold is between 3 mm and 5 mm.

4. The method according to claim 2, wherein the method further comprises:
determining M1 pieces of inspection data of the tab according to the multiple pieces of inspection data, wherein the M1 pieces of inspection data are inspection data of the tab at M1 consecutive positions of the second direction, the M1 pieces of inspection data are inspection data of a height of the tab in the first direction, and M1 is a positive integer greater than 1; and
determining, according to the M1 pieces of inspection data, whether a shape of the tab is normal.

5. The method according to claim 4, wherein the determining M1 pieces of inspection data of the tab according to the multiple pieces of inspection data comprises:
determining, as initial inspection data, inspection data that increases by a change exceeding the first threshold among the multiple pieces of inspection data; and
determining, as the M1 pieces of inspection data of the tab, M1 pieces of consecutive inspection data starting from the initial inspection data.

6. The method according to claim 4, wherein the determining, according to the M1 pieces of inspection data, whether a shape of the tab is normal comprises:
selecting N1 pieces of inspection data from the M1 pieces of inspection data, wherein N1<M1; and
determining, according to a relationship between the N1 pieces of inspection data and a second threshold, whether the tab is folded, wherein the second threshold is determined based on a preset height of the tab in the first direction.

7. The method according to claim 4, wherein the determining, according to the M1 pieces of inspection data, whether a shape of the tab is normal comprises:
respectively selecting N2 pieces of inspection data and N3 pieces of inspection data from the M1 pieces of inspection data, wherein N2 and N3 are positive integers greater than 1, N2<M1, and N3<M1; and
determining, according to a relationship between the N2 pieces of inspection data and a third threshold and a relationship between the N3 pieces of inspection data and a fourth threshold, whether the tab is damaged, wherein the third threshold and the fourth threshold are determined based on the preset height of the tab in the first direction.

8. The method according to claim 7, wherein the N2 pieces of inspection data are N2 pieces of inspection data in the middle of the M1 pieces of inspection data, and the N3 pieces of inspection data are N3 pieces of inspection data at two ends of the M1 pieces of inspection data.

9. The method according to claim 4, wherein the method further comprises:
determining the position of the tab on the electrode plate according to the second trigger manner; and
determining, as the M2 pieces of inspection data of the tab, M2 pieces of inspection data corresponding to the position among the multiple pieces of inspection data, wherein the M2 pieces of inspection data comprise inspection data corresponding to the first start position, or the M1 pieces of inspection data comprise inspection data corresponding to the second start position.

10. The method according to claim 2, wherein the method further comprises:
determining P pieces of inspection data of a non-tab region on the end face of the electrode plate according to the multiple pieces of inspection data, wherein the P pieces of inspection data are inspection data of the non-tab region at P different consecutive positions of the second direction, the P pieces of inspection data are inspection data corresponding to a height of the non-tab region in the first direction, and P is a positive integer greater than 1; and
determining, according to the P pieces of inspection data, whether a shape of the end face of the electrode plate is normal.

11. The method according to claim 10, wherein the determining, according to the P pieces of inspection data, whether a shape of the end face of the electrode plate is normal comprises:
if differences between more than Q1 pieces of consecutive inspection data among the P pieces of inspection data and inspection data adjacent to the more than Q1 pieces of consecutive inspection data fall within a fifth threshold range, determining that the end face of the electrode plate is damaged, wherein Q1 is a preset value.

12. The method according to claim 10, wherein the determining, according to the P pieces of inspection data, whether a shape of the end face of the electrode plate is normal comprises:
if absolute values of the Q2 pieces of inspection data among the P pieces of inspection data are greater than a sixth threshold, determining that a movement direction of the electrode plate deviates from the second direction in an inspection process.

13. The method according to claim 1, wherein the determining a second start position of the tab in the second direction of the electrode plate according to a second trigger manner comprises:
determining the second start position according to a preset distance between the electrode plate and a preset position.

14. The method according to claim 1, wherein the determining, according to a distance between the second start position and the first start position, whether a position of the tab on the electrode plate deviates comprises:
if the distance between the second start position and the first start position is equal to 0, determining that the tab does not deviate; and/or
if the distance between the second start position and the first start position is greater than 0, determining that the tab deviates.

15. The method according to claim 14, wherein if it is determined that the tab deviates, the method further comprises:
if the distance between the second start position and the first start position is less than a seventh threshold, determining that the position of the tab on the electrode plate needs to be adjusted; and/or
if the distance between the second start position and the first start position is greater than a seventh threshold, determining that a section of the tab on the electrode plate needs to be removed.

16. The method according to claim 1, wherein multiple tabs disposed in the second direction on the end face of the electrode plate have different heights.

17. The method according to claim 1, wherein the sensor is configured to inspect the tab in a process of die-cutting the electrode plate to form the tab; or the sensor is configured to inspect the tab in a process of winding the electrode plate to form an electrode component.

18. A tab inspection apparatus, configured to perform the method according to claim 1.

19. A tab inspection apparatus, comprising a processor and a memory, wherein the memory is configured to store a computer program, and the processor is configured to invoke the computer program to execute the tab inspection method according to claim 1.

* * * * *